United States Patent
Parker et al.

(10) Patent No.: US 8,361,396 B2
(45) Date of Patent: Jan. 29, 2013

(54) AUTOMATED POLYMER-SYNTHESIS SYSTEM

(75) Inventors: Hsing-Yeh Parker, Woodinville, WA (US); John C. Tabone, Bothell, WA (US); John Mulligan, Seattle, WA (US)

(73) Assignee: Oligoco, Inc., Bothell, WA (US)

( * ) Notice: Subject to any disclaimer, the term of this patent is extended or adjusted under 35 U.S.C. 154(b) by 151 days.

(21) Appl. No.: 12/932,334

(22) Filed: Feb. 22, 2011

(65) Prior Publication Data

US 2011/0256031 A1  Oct. 20, 2011

Related U.S. Application Data

(60) Provisional application No. 61/306,906, filed on Feb. 22, 2010, provisional application No. 61/312,862, filed on Mar. 11, 2010.

(51) Int. Cl.
*B01J 19/00* (2006.01)
*G01N 21/00* (2006.01)

(52) U.S. Cl. ......... 422/131; 422/132; 422/134; 422/62; 422/63; 422/65; 422/67; 422/509; 422/105; 422/116

(58) Field of Classification Search .................. 422/131, 422/132, 134, 62, 63, 65, 67, 509, 105, 116
See application file for complete search history.

(56) References Cited

U.S. PATENT DOCUMENTS

| | | | |
|---|---|---|---|
| 5,252,296 A | 10/1993 | Zuckermann | |
| 5,368,823 A * | 11/1994 | McGraw et al. | 422/134 |
| 6,800,250 B1 * | 10/2004 | Hunicke-Smith et al. | 422/65 |
| 7,160,517 B2 | 1/2007 | Seeberger | |
| 2006/0263534 A1 | 11/2006 | Laurent | |

FOREIGN PATENT DOCUMENTS

WO  2005110593  11/2005

* cited by examiner

*Primary Examiner* — Walter D Griffin
*Assistant Examiner* — Lassanework Seifu
(74) *Attorney, Agent, or Firm* — Olympic Patent Works PLLC

(57) ABSTRACT

Embodiments of the present invention are directed to automated-polymer-synthesis systems that include discrete reagent-solution-addition, wait-time, and reagent-solution-draining sub-systems which together significantly increase throughput and decrease sub-system idle time. The automated-polymer-synthesis systems that represent embodiments of the present invention additionally include switches at points in which carriers can be received from multiple input paths or output to multiple different output paths. The automated-polymer-synthesis systems that represent embodiments of the present invention generally include an input spur and output spur in addition to a main loop, allowing carriers containing only completed polymers to be removed and new carriers input, so that carriers traverse the automated-polymer-synthesis systems independently from one another.

4 Claims, 23 Drawing Sheets

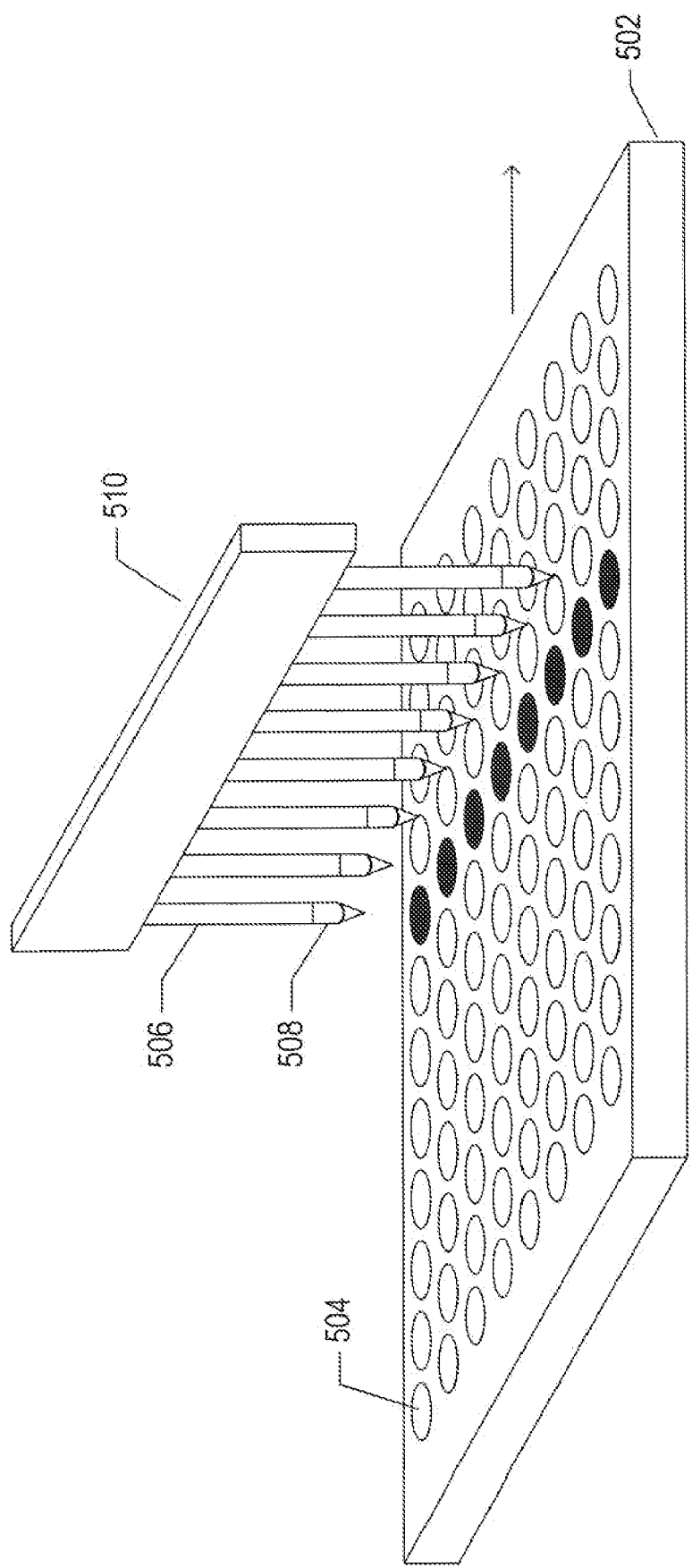

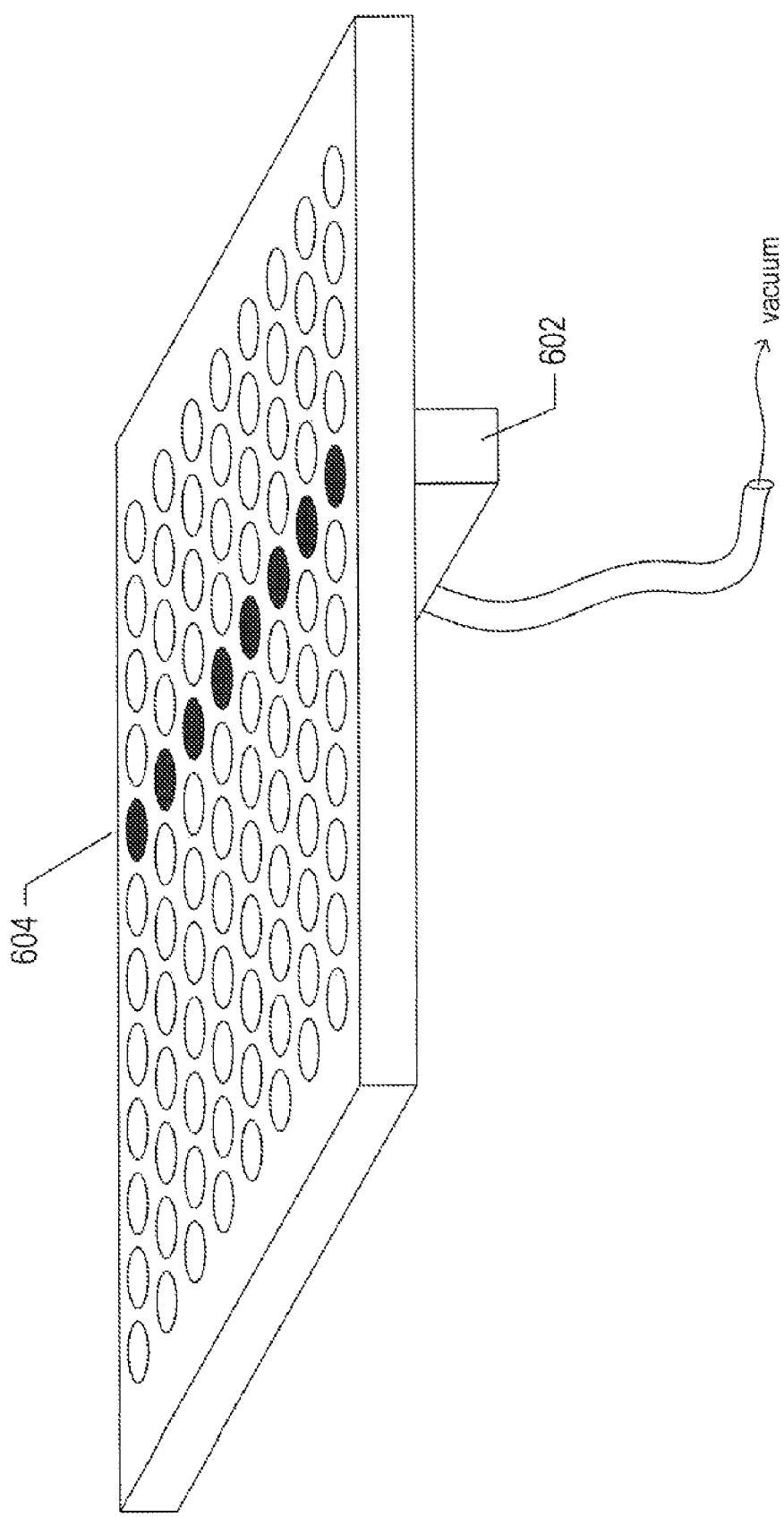

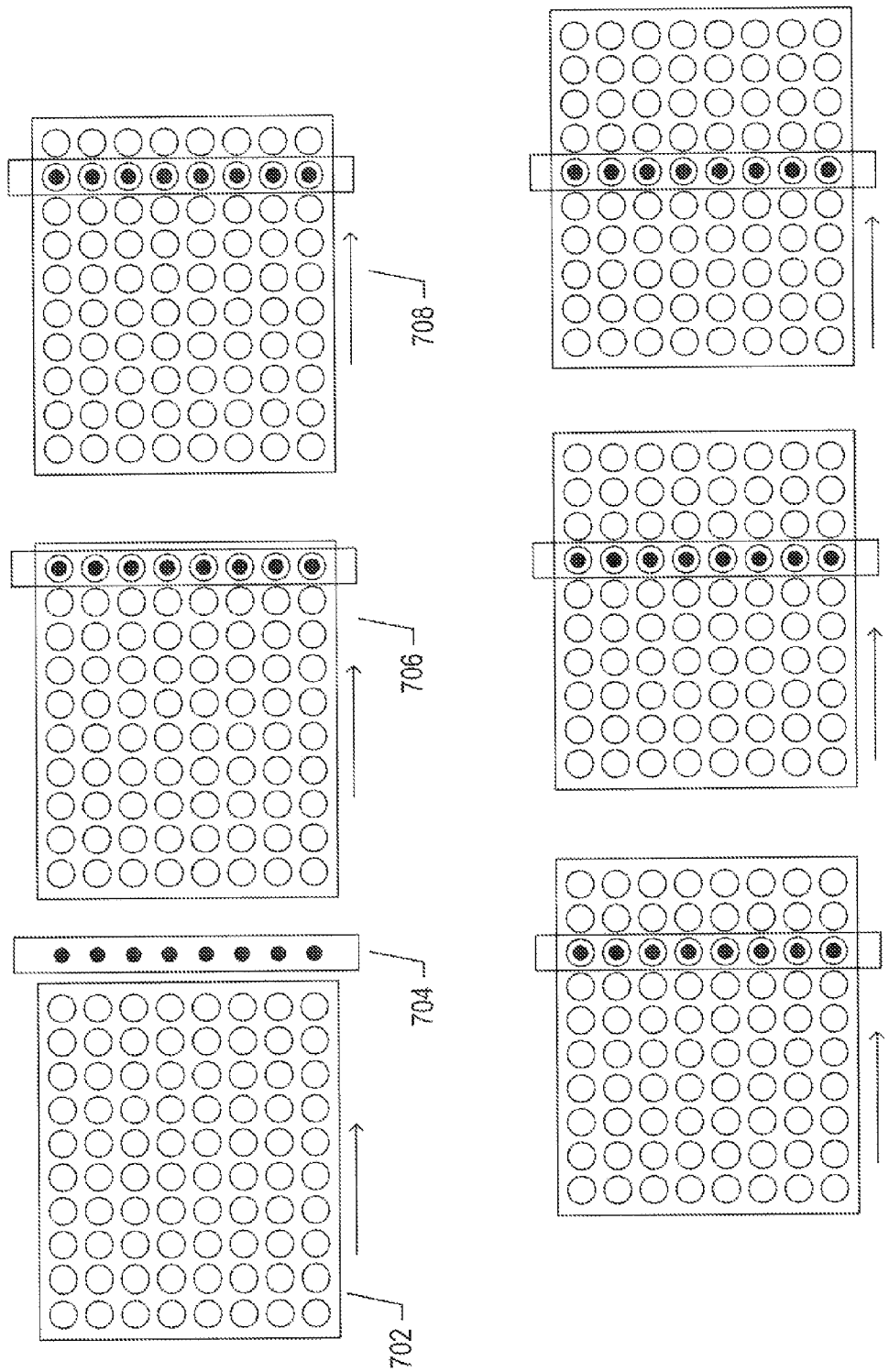

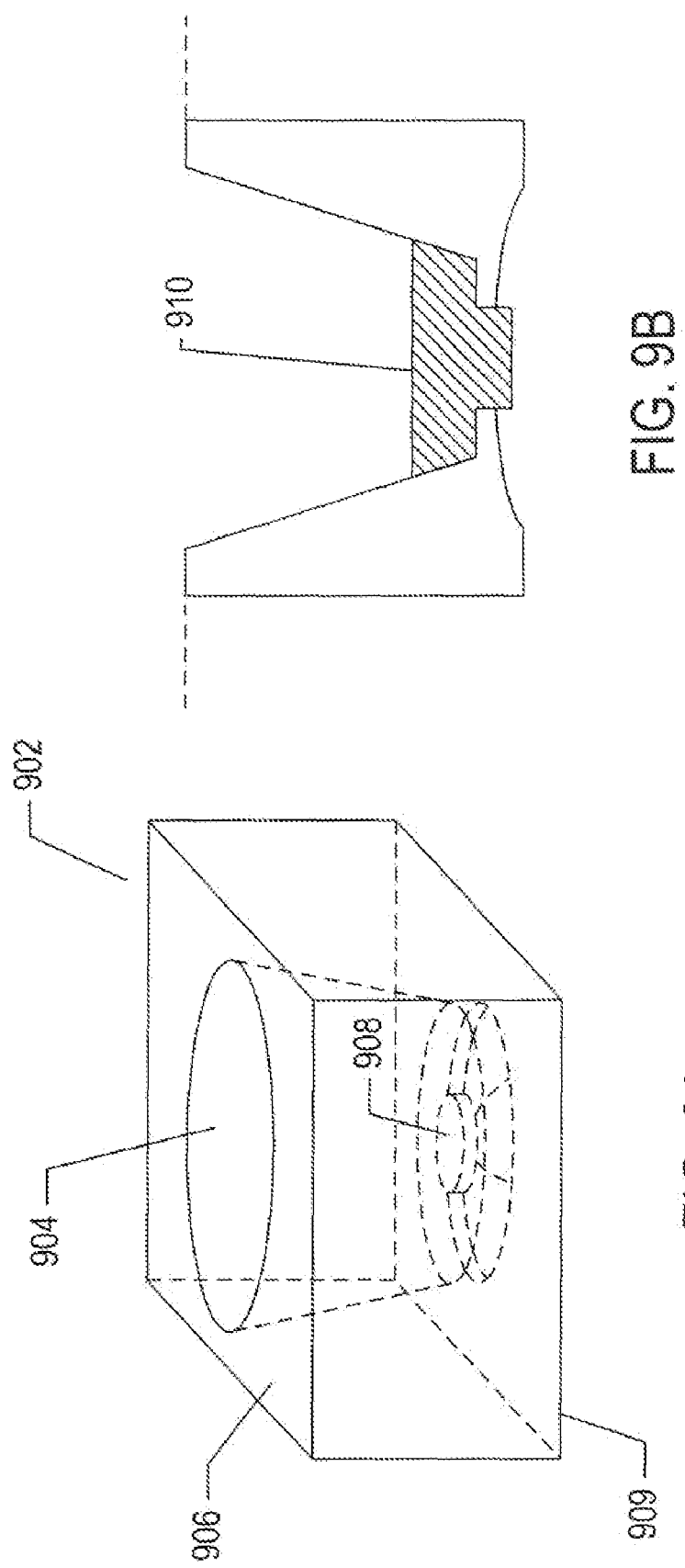

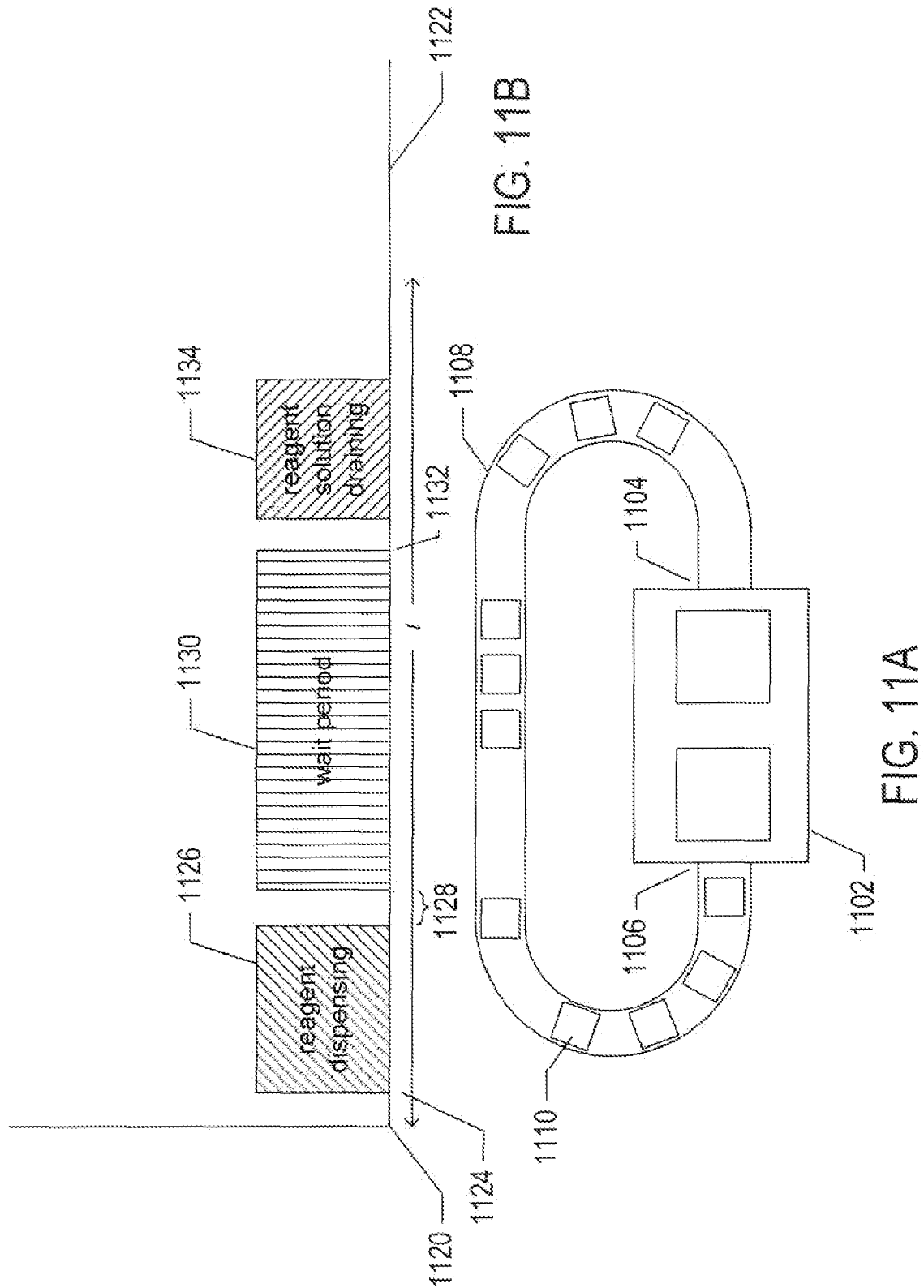

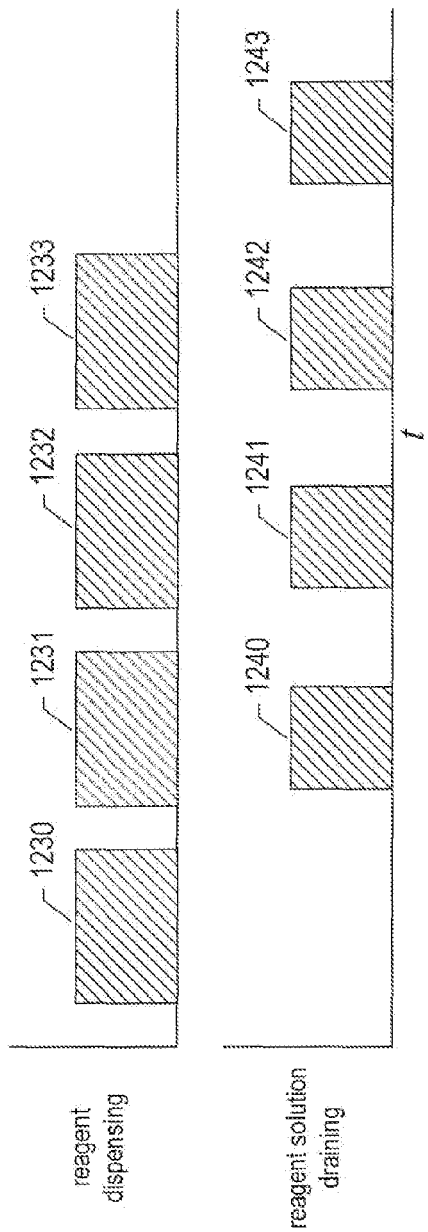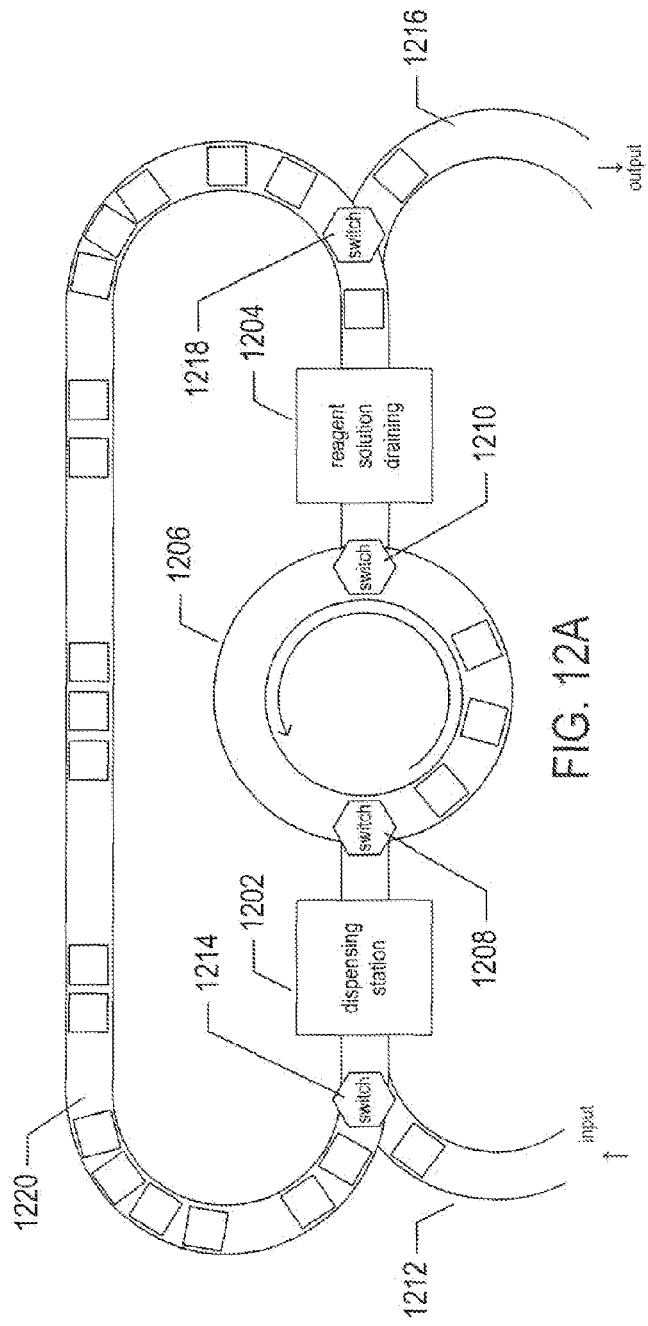

US 8,361,396 B2

AUTOMATED POLYMER-SYNTHESIS SYSTEM

CROSS-REFERENCE TO RELATED APPLICATIONS

This application claims the benefit of Provisional Application No. 61/306,906 filed Feb. 22, 2010 and Provisional Application No. 61/312,862, filed Mar. 11, 2010.

TECHNICAL FIELD

The present invention is related to systems for automated synthesis of biopolymers and synthetic polymers, and, in particular, to an automated-polymer-synthesis system that features discrete reagent-solution-addition, wait-time, and reagent-solution-draining subcomponents.

BACKGROUND

Biopolymers, including deoxyribonucleic acid ("DNA"), ribonucleic acid ("RNA"), proteins, polysaccharides, and more complex biopolymers together form the chemical and structural framework for living organisms. Biopolymers serve as a repository for genetic information, catalyze myriad different chemical reactions within organisms, provide many different types of intracellular and intercellular information transmission and communication within organisms, and provide the structural components for cells, organs, and organisms.

During the past century, great strides have been made understanding and learning to manipulate the molecular and cellular biochemical machinery of living organisms. Once the chemical identities and structures of biopolymers were discovered and elaborated, researchers began to chemically synthesize biopolymers and biopolymer fragments to use as tools for research as well as for various types of manufacturing processes. For example, synthesis of oligonucleotides, short DNA and RNA biopolymers having lengths of up to approximately 200 monomer units, provides oligonucleotides of specific sequences that are used to initiate enzyme-catalyzed transcription of DNA, as probes in microarrays and other analytical instruments, for manipulating and controlling gene expression in bacteria and other organisms, and for many other purposes. Similarly, synthesis of peptides, short polymers of amino-acids subunits, provides peptide pharmaceuticals, probes, catalysts, and other useful peptide-based products.

Automated-biopolymer-synthesis systems have been commercially available for many years. Many automated-biopolymer-synthesis systems employ solid substrates, such as polystyrene beads, to which nascent biopolymers are covalently bound and grown by repeating a cycle of monomer-addition reaction steps. The solid substrate allows the reagents used during a reaction step to be easily rinsed from the nascent biopolymers and solid substrate to prepare for a subsequent reaction step.

Unfortunately, currently-available automated-polymer-synthesis systems suffer from a number of inherent inefficiencies and deficiencies, including low throughput and lengthy specialized-component idle periods. Designers and developers of automated-polymer-synthesis systems continue to seek novel designs that address these inefficiencies and deficiencies.

SUMMARY

Embodiments of the present invention are directed to automated-polymer-synthesis systems that include discrete reagent-solution-addition, wait-time, and reagent-solution-draining sub-systems which together significantly increase throughput and decrease sub-system idle time. The automated-polymer-synthesis systems that represent embodiments of the present invention additionally include switches at points in which carriers can be received from multiple input paths or output to multiple different output paths. The automated-polymer-synthesis systems that represent embodiments of the present invention generally include an input spur and output spur in addition to a main loop, allowing carriers containing only completed polymers to be removed and new carriers input, so that carriers traverse the automated-polymer-synthesis systems independently from one another.

BRIEF DESCRIPTION OF THE DRAWINGS

FIGS. 5 and 6 illustrate two general operations involved in automated-oligonucleotide synthesis.

FIGS. 7A-B illustrate two different approaches to automated addition of reagent solutions to rows of wells within an RCP during automated-oligonucleotide synthesis.

FIGS. 9A-B illustrate an individual reaction chamber, or well, used in a low-volume automated-oligonucleotide-synthesis system that represents one embodiment of the present invention.

FIGS. 11A-B illustrate one example of a current automated-oligonucleotide-synthesis system FIGS. 12A-B illustrate an example of automated-oligonucleotide-synthesis systems that represent embodiments of the present invention.

DETAILED DESCRIPTION

Embodiments of the present invention are directed to automated-polymer-synthesis systems that include discrete reagent-solution-addition, wait-time, and reagent-solutiondraining sub-systems which together significantly increase throughput and decrease sub-system idle time. In the following discussion, automated-oligonucleotide-synthesis systems are used as example systems that incorporate embodiments of the present invention. However, embodiments of the present invention may be similarly incorporated within automated polymer-synthesis systems that synthesize other types of biopolymers and synthetic polymers.

Figure 1:
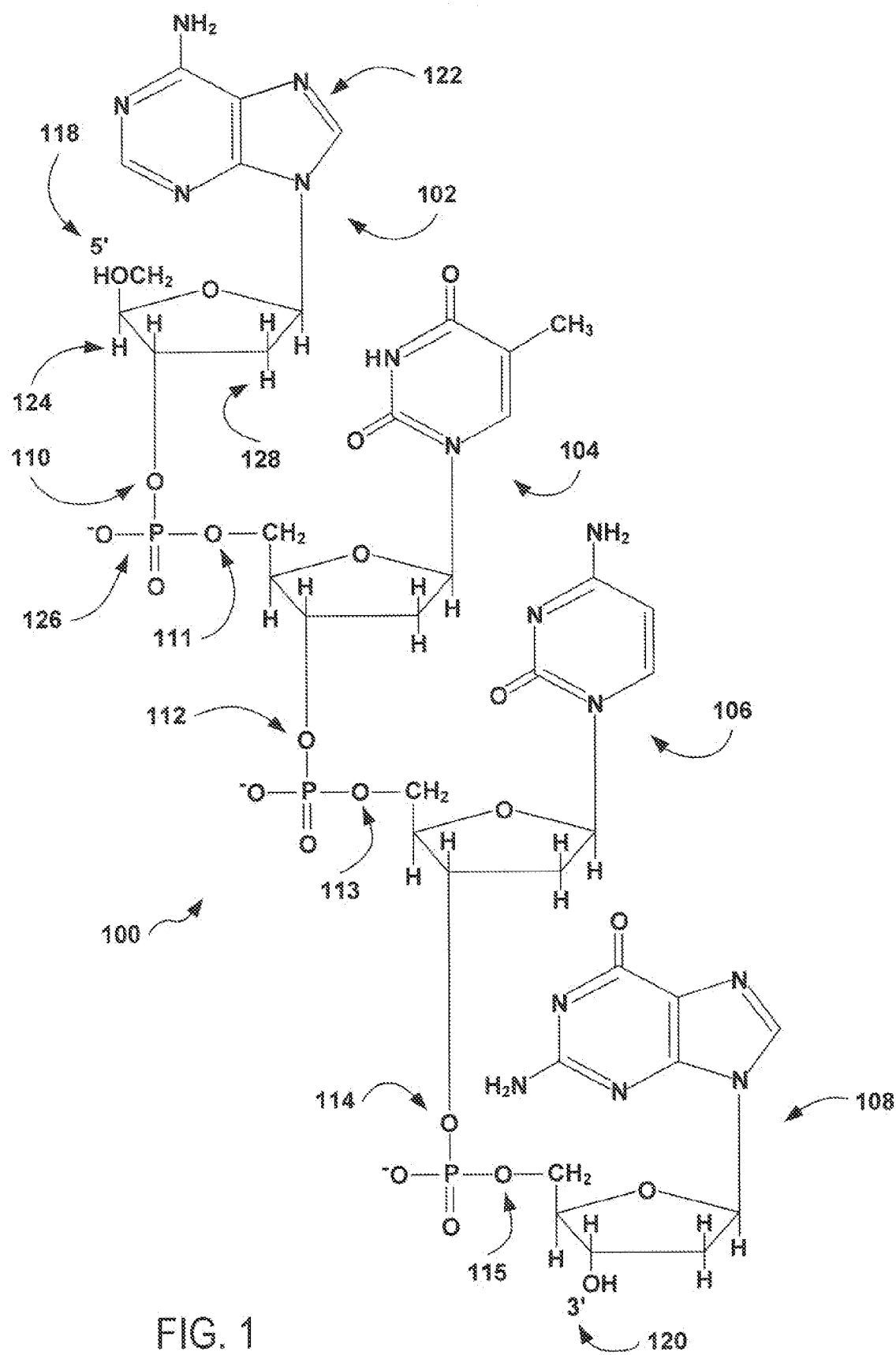
FIG. 1 illustrates a short DNA polymer.

Deoxyribonucleic acid ("DNA") and ribonucleic acid ("RNA") are linear polymers, each synthesized from four different types of subunit molecules. The subunit molecules for DNA include: (1) deoxy-adenosine, abbreviated "A," a purine nucleoside; (2) thymidine, abbreviated "T," a pyrimidine nucleoside; (3) deoxy-cytosine, abbreviated "C," a pyrimidine nucleoside; and (4) deoxy-guanosine, abbreviated "G," a purine nucleoside. The subunit molecules for RNA include: (1) adenosine, abbreviated "A," a purine nucleoside; (2) uracil, abbreviated "U," a pyrimidine nucleoside; (3) cytosine, abbreviated "C," a pyrimidine nucleoside; and (4) guanosine, abbreviated "G," a purine nucleoside. FIG. 1 illustrates a short DNA polymer. The short DNA polymer 100, called an oligomer, is composed of the following subunits: (1) deoxy-adenosine 102; (2) thymidine 104; (3) deoxy-cytosine 106; and (4) deoxy-guanosine 108. When phosphorylated, subunits of DNA and RNA molecules are called "nucleotides" and are linked together through phosphodiester bonds 110-115 to form DNA and RNA polymers. A linear DNA molecule, such as the oligomer shown in FIG. 1, has a 5' end 118 and a 3' end 120. A DNA polymer can be chemically characterized by writing, in sequence from the 5' end to the 3' end, the single letter abbreviations for the nucleotide subunits that together compose the DNA polymer. For example, the oligomer 100 shown in FIG. 1 can be chemically represented as "ATCG." A DNA nucleotide comprises a purine or pyrimidine base (e.g. adenine 122 of the deoxy-adenylate nucleotide 102), a deoxy-ribose sugar (e.g. deoxy-ribose 124 of the deoxy-adenylate nucleotide 102), and a phosphate group (e.g. phosphate 126) that links one nucleotide to another nucleotide in the DNA polymer. In RNA polymers, the nucleotides contain ribose sugars rather than deoxy-ribose sugars. In ribose, a hydroxyl group takes the place of the 2' hydrogen 128 in a DNA nucleotide. RNA polymers contain uridine nucleosides rather than the deoxy-thymidine nucleosides contained in DNA. The pyrimidine base uracil lacks a methyl group (130 in FIG. 1) contained in the pyrimidine base thymine of thymidine.

Figure 2:
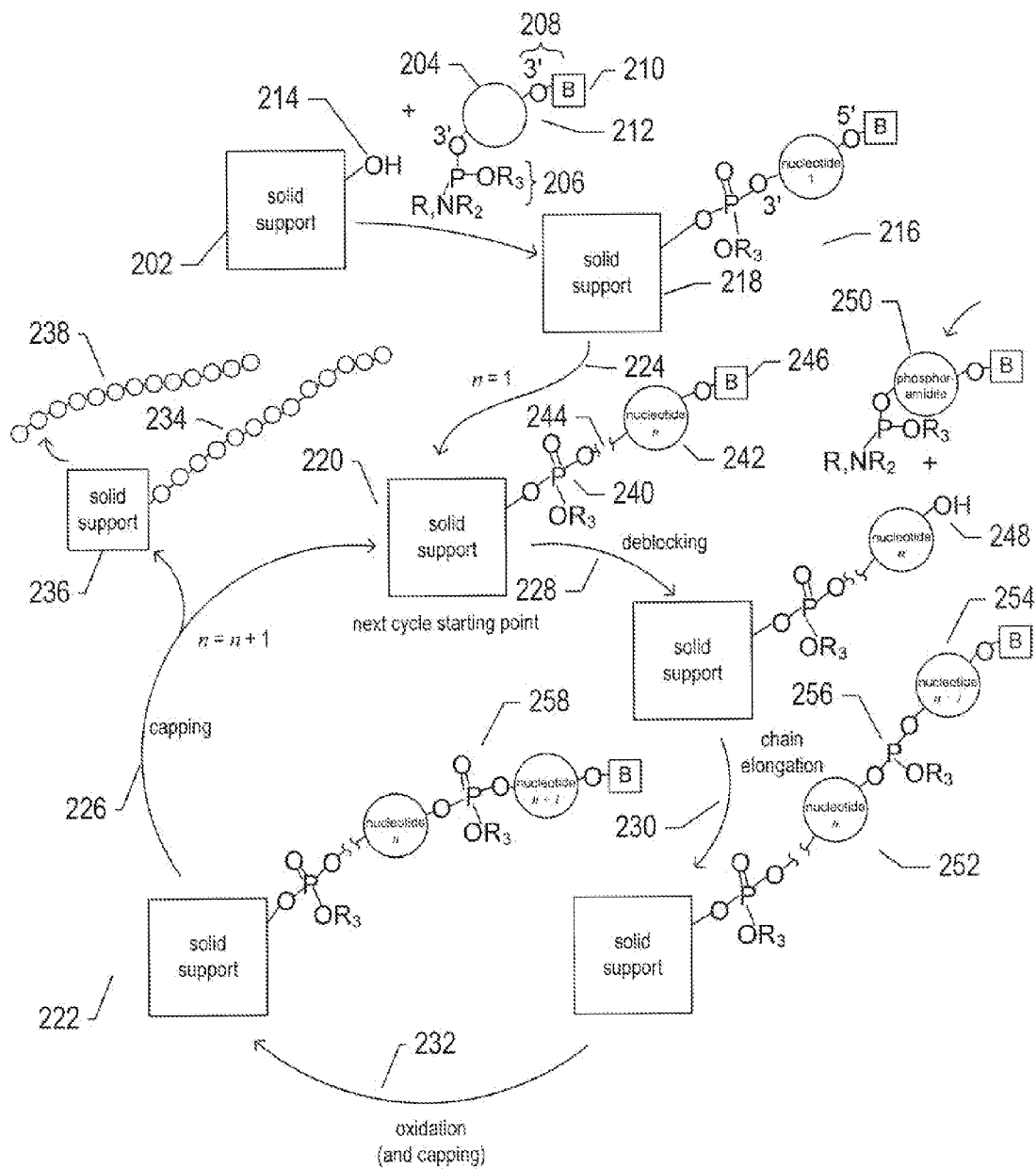
FIG. 2 illustrates a general synthetic scheme for an automated-oligonucleotide-synthesis system.

FIG. 2 illustrates a general synthetic scheme for an automated-oligonucleotide-synthesis system. In FIG. 2, schematic-like illustration features are employed to illustrate the solid support, phosphoramidite monomer, and growing oligonucleotide polymer. The solid support is shown in FIG. 2 as a large rectangle, such as large rectangle 202. Phosphoramidite monomers that are added to growing oligonucleotides during each monomer-addition cycle are each represented by a circle, such as circle 204, with protruding 3' 206 and 5' 208 functional groups. The 3' functional group 206 is an amide of a phosphodiester and the 5' 208 functional group is a hydroxyl group in which a large organic blocking group, represented in FIG. 2 by a small rectangle that includes the label "B" 210 has replaced the hydrogen atom. In an initial step in the synthesis of an oligonucleotide, the first 3' nucleotide is added to the solid support, as shown in FIG. 2, by reacting the corresponding phosphoramidite 212 with a free hydroxyl group 214 extending from the solid support 202. Although only a single hydroxyl group and a single solid support is shown in FIG. 2, in an automated-oligonucleotide-synthesis system, a large number of controlled-pour-glass beads or polystyrene beads, which are derivatized to feature a very large number of accessible free hydroxyl groups, are employed as a collective solid support for oligonucleotide synthesis. Therefore, in any particular reaction chamber, a very large number of individual oligonucleotides of a particular sequence are produced. Furthermore, it is the sequence of particular A, G, T, and C monomers within a DNA oligonucleotide that defines the oligonucleotide's chemical identity. The purpose of automated-oligonucleotide synthesis is to produce, in general, a single type of oligonucleotide having a particular sequence of nucleotides in each reaction chamber. Thus, in this and following descriptions and discussions, it is understood that adding a phosphoramidite to a reaction chamber in order to add a next monomer to the 5' end of a nascent oligonucleotide implies adding the particular phosphoramidite corresponding to the particular monomer to be added to the oligonucleotide. Reaction of the phosphoramidite 212 and the free hydroxyl group 214 of the solid support produces a nascent oligonucleotide 216 bound to the solid support 218. This single-monomer nascent oligonucleotide then serves as the starting point 220 for a first monomer-addition cycle. In all but the first iteration of the monomer-addition cycle, a longer, growing oligonucleotide bound to the solid support 222 becomes the starting point for a next monomer-addition cycle. Thus, arrow 224 represents a special case, in which cyclical monomer addition is initialized, and arrow 226 represents a general case, in which the product of a just-completed monomer-addition cycle becomes the starting point for a next cycle of monomer addition.

The monomer-addition cycle comprises four basic steps represented by arrows 228, 230, 232, and 226. When a final, desired oligonucleotide with n nucleotide subunits has been synthesized by n-1 iterations of the monomer-addition cycle, the completed oligonucleotide 234 is removed from the solid support 236 by addition of a weak acid to generate the final oligonucleotide product 238. In general, various blocking groups render functional groups of the nucleotide subunits unreactive towards reagents used in the monomer-addition cycle and are also cleaved from the final oligonucleotide prior to, or following, removal of the oligonucleotide product from the solid support. In FIG. 2, the nascent oligonucleotide is shown as the 3-terminal phosphate group 240 and the last-added nucleotide 242, with the remaining nucleotides represented by the break 244 in the polymer chain.

In the deblocking step 228, the blocking group 246 is removed from the 5' hydroxyl of the last-added nucleotide to produce a nascent oligonucleotide with a free 5' hydroxyl group 248. Then, in the chain elongation step 230, a next appropriate phosphoramidite 250 is added to the nascent oligonucleotide 248, resulting in the nascent oligonucleotide growing by one nucleotide subunit at the 5' end 254. Note that the terminal nucleotide is connected to the nascent oligonucleotide via a phosphite 256, rather than phosphate, link. In the oxidation step 232, the phosphite link is oxidized to produce a phosphate linkage 258. In a final step of the monomer-addition cycle 226, capping agents are added to render any unreacted substrate hydroxyls or unreacted 5' hydroxyls of nascent oligonucleotides unreactive towards subsequent phosphoramidite additions. This capping step prevents the undesired synthesis of oligonucleotides having fewer nucleotide subunits than the desired oligonucleotide product.

Figure 3:
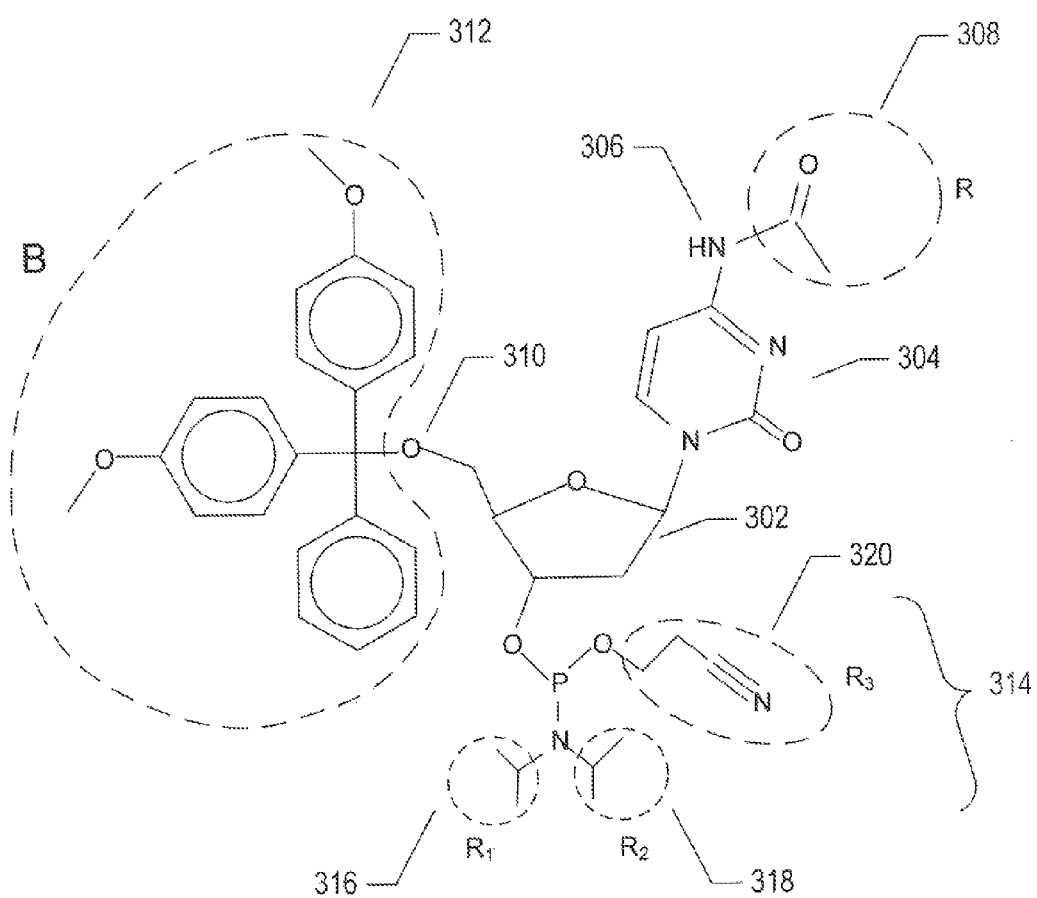
FIG. 3 shows the chemical structure of one particular phosphoramidite reagent used in oligonucleotide synthesis.

FIG. 3 shows the chemical structure of one particular phosphoramidite reagent used in oligonucleotide synthesis. The phosphoramidite shown in FIG. 3 is the phosphoramidite analog of deoxy-cytosine monophosphate. The phosphoramidite shown in FIG. 3 includes a deoxy-ribose moiety 302, a cytosine moiety 304 with the free amino group 306 protected by acetylation 308. The 5' hydroxyl group 310 of the ribose moiety 302 is protected by substitution of hydrogen with a 4,4'-dimethoxytrityl ("DMT") protecting group 312. The phosphodiester amide group 314 includes two isopropyl R groups 316 and 318 as well as a cyanoethyl R group 320.

Figure 4:
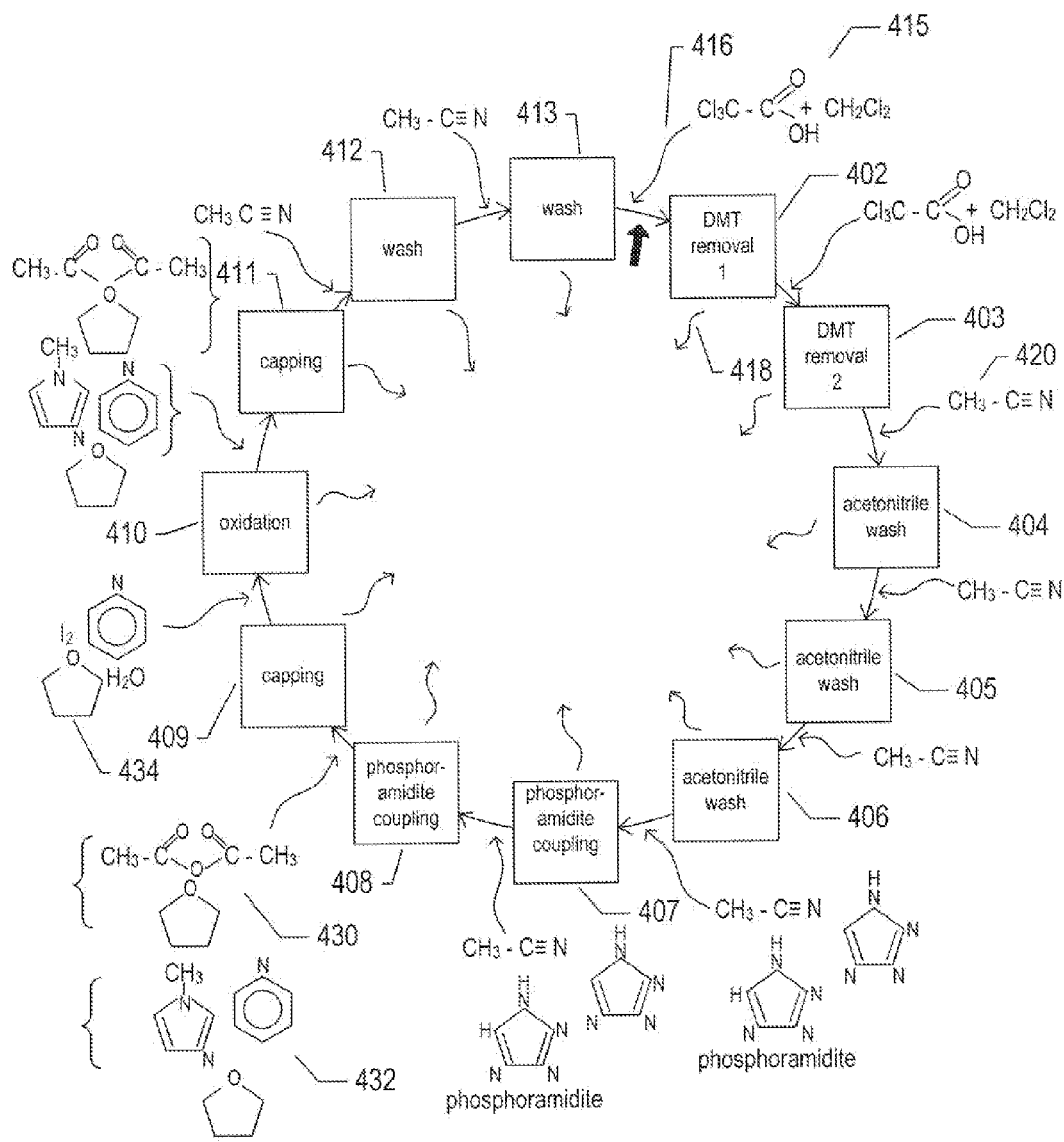
FIG. 4 shows a detailed monomer-addition cycle representative of the monomer-addition cycles used in various automated-oligonucleotide-synthesis systems.

FIG. 4 shows a detailed monomer-addition cycle representative of the monomer-addition cycles used in various automated-oligonucleotide-synthesis systems. The monomer-addition cycle includes 12 steps 402-413. The first two steps 402 and 403 are identical DMT-removal steps corresponding to the deblocking step 228 in FIG. 2. For each DMT-removal step, a mixture of trichloroacetic acid and methylenechloride 415 is added to a reaction chamber including a 5' DMT-protected nascent oligonucleotide attached to a solid support. As indicated by curved arrows in FIG. 4, each step in the monomer-addition cycle involves addition of reagents, such as the addition of trichloroacetic acid and methylenechloride, represented by arrow 416 immediately prior to the first deblocking step 402, and removal of the added reagents, represented by curved arrows, such as curved arrow 418, when the step is completed.

Following DMT removal, the next three steps 404-406 are identical acetonitrile wash steps, in each of which acetonitrile 420 is added to the reaction chamber and then removed. The acetonitrile washing step removes the free DMT and trichloroacetic acid and methylenechloride from the reaction chamber. Next, in two identical coupling steps 407 and 408, an appropriate phosphoramidite in acetonitrile and tetrazole is added to the reaction chamber in order to couple the phosphoramidite to the 5' end of a nascent oligonucleotide. Next, in a first capping step 409, a cap A solution comprising acetic anhydride in tetrahydrofuran 430 and a cap B solution comprising methylimidazole in pyridine and tetrahydrofuran 432 are added to the reaction chamber in order to acetylate any remaining free hydroxyls of the substrate and any free 5' hydroxyls of nascent oligonucleotides. Then, in oxidation step 410, iodine in pyridine, tetrahydrofuran, and water 434 is added to the reaction chamber in order to oxidize the phosphite linkage between the just-added nucleotide and the remaining nascent oligonucleotide to a phosphate linkage. This oxidation step is followed by a second capping step 411 identical to capping step 409. Finally, two wash steps 412 and 413 identical to wash steps 404-406 are carried out to remove any unreacted, coupling, capping, and oxidation reagents in order to produce a clean nascent oligonucleotide bound to a solid support for initiation of a next monomer-addition cycle.

There are many different types of apparatuses and configurations for automatic synthesis of oligonucleotides. For a low-volume automated-oligonucleotide-synthesis system in which embodiments of the present invention are incorporated, the reaction chambers may be small wells within plate-like arrays of wells. Often, 8×12 96-well reaction-chamber plates ("RCPs") are employed, although the dimensions of the arrays can be arbitrarily selected.

FIGS. 5 and 6 illustrate two general operations involved in automated-oligonucleotide synthesis. These operations include addition of reagents to carry out a next substep, such as the addition of trichloroacetic acid and methylenechloride (416 in FIG. 4) in order to remove the DMT protection group from the 5' hydroxyl of the nascent oligonucleotide, and a reagent-draining or reagent-removal step, such as the removal of the trichloroacetic acid and methylenechloride (418 in FIG. 4) following completion of DMT removal or nascent-oligonucleotide deblocking. As can be seen in FIG. 4, each step of the 12 steps in the monomer-addition cycle involves addition of one or more reagents and/or solvents, a reaction or process that occurs following addition of the one or more reagents and/or solvents, and a reagent-solution removal step.

FIG. 5 shows an RCP 502 containing an array of wells, or reaction chambers, such as well 504. As discussed above, a particular oligonucleotide having a particular monomer sequence is synthesized on a solid support within each of these wells. Thus, RCP 502 may be used to synthesize as many different oligonucleotides as there are well in the RCP. In general, the RCP is moved along a conveyor belt or track, or moved by any of various alternative mechanical methods into positions in which reagents can be added to a row of wells, or reaction chambers, of the RCP. In FIG. 5, an assembly of eight reagent-addition tubes, such as reagent-addition tube 506, each controlled by an electromechanical valve, such as valve 508, is positioned above eight wells of the RCP. The eight wells directly below the reagent-addition tubes are shaded in FIG. 5. The electromechanical valve of each tube from which reagent is to be added to a well is then activated to add an appropriate amount of the reagent to the well. In certain steps, such as the acetonitrile wash steps 404-406 and 412-413 in FIG. 4, all eight reagent-addition tubes in a reagent-addition-tube assembly positioned above a row of wells may be controlled to add the same amount of reagent to all eight wells in the row. However, in other steps, such as the coupling steps 407 and 408 in FIG. 4, a particular phosphoramidite-coupling solution may be added to only a subset of the wells in a row of wells positioned under the reagent-addition-tube assembly. In general, each reagent-addition tube is entirely devoted to adding a particular reagent solution or solvent to RCP wells. By devoting reagent-addition tubes entirely to a particular reagent solution or solvent, intermediate washing steps are avoided, along with the risk of cross-contamination and the mechanical complexity of routing different types of solutions to a single reagent-addition tube. Therefore, in order to carry out a next step, the RCP is passed under either a single reagent-addition-tube assembly, in the case of steps for which a single reagent solution is added to each well in a row, or passed under four different reagent-addition-tube assemblies for the four different phosphoramidite coupling agents used during the phosphoramidite-coupling step. In one type of automated-oligonucleotide-synthesis system, as an example, RCP 502 may be precisely moved to position each successive row of eight wells under the reaction-addition-tube assembly 510 in order to add a particular reagent solution to all wells of the RCP in order to carry out the reagent-addition portion of a next step of a monomer-addition cycle. For the phosphoramidite-coupling step, each row of wells of the RCP 502 may be precisely positioned under each of four different reaction-addition-tube assemblies so that the appropriate phosphoramidite-coupling solution can be added to each well of the RCP.

It should be noted that an automated-oligonucleotide-synthesis system in generally controlled by a computer or microprocessor. As a result, addition of solution and removal of solution can be controlled at the level of individual wells. A given RCP may be used for synthesis of oligonucleotides of different lengths, with certain reagent-addition and reagent-draining steps omitted for the shorter-length-oligonucleotide-containing wells.

Once the reagent solution and/or solvents used for a next step in the monomer-addition cycle has been completed, the reagent solution and/or solvents generally remain in contact with the nascent oligonucleotides attached to the solid substrate for a period of time. For low-volume automated-oligo-nucleotide-synthesis systems in which embodiments of the present invention are incorporated, the reaction times range from 15 seconds to a minute or more, with 30 seconds considered to be, in certain cases, an average reaction time. Spent and unreacted reagents and reaction products, other than the nascent oligonucleotides still covalently attached to the solid substrate, are then drained from the reaction chamber or wells. In certain cases, the nascent oligonucleotides, solid support, and wells are washed in acetonitrile or other solvents, and the wash solvent is then drained to ensure removal of spent and unreacted reagents and reaction products from the reaction chamber and solid substrate. As shown in FIG. 6, draining of the reaction chambers, or wells, is traditionally carried out by applying a pressure differential, often through vacuum suction, to the reaction chambers in order to remove solution from the reaction chambers. In FIG. 6, a pressure-differential-applying and solution-draining assembly 602 is positioned beneath the row of wells 604 to which reagent solutions were added by the reagent-addition-tube assembly, in FIG. 5, to remove the added reagent solutions following the appropriate wait time or wait period.

Figure 7B:
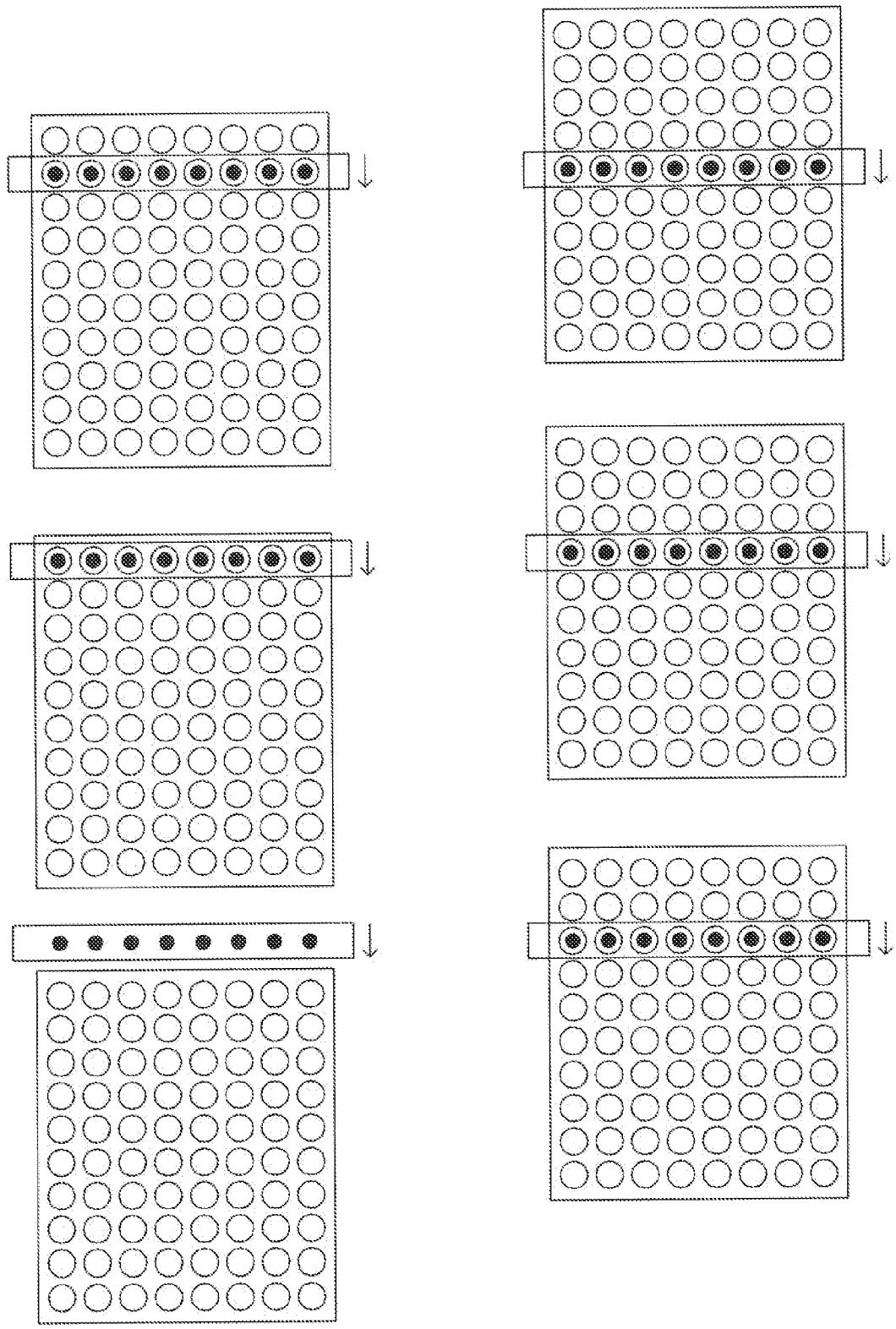

There are many different ways to design and configure electromechanical subcomponents, within an automated-oligonucleotide-synthesis system, for adding reagent solutions to reaction chambers and removing reagent solutions from reaction chambers. FIGS. 7A-B illustrate two different approaches to automated addition of reagent solutions to rows of wells within an RCP during automated-oligonucleotide synthesis. In FIG. 7A, an RCP 702 is moved, on a surface of electromechanically driven rollers, a chain-driven conveyer, a belt-driven conveyor, or by some other electromechanical means, toward a reagent-addition-tube assembly 704, such as that shown in FIG. 5, for addition of reagents to the wells of the RCP as the initial substep in a next step of the monomer-addition cycle. As shown in FIG. 7A, the RCP is first positioned with a first row of wells below the reagent-addition-tube assembly 706, and the electromechanical valves are activated to introduce precise volumes of a reagent solution into each of one or more selected wells. Then, the RCP is moved forward in order to place a second row of wells below the reagent-addition-tube assembly 708. This process continues, row-by-row, until the reagent solution is added to each of a predetermined set of wells within the RCP. By this method, the reagent-addition-tube assembly is essentially stationary, while the RCP is moved precisely to align rows of wells with the reagent-addition-tube assembly. In a different method, illustrated in FIG. 7B, the RCP remains stationary while the reagent-addition-tube assembly is moved to align the reagent-addition tubes with successive rows of wells. In the technique shown in FIG. 7B, the reagent-addition-tube assembly is moved in a direction parallel to the direction in which the RCPs are moved along a conveyor belt or other mechanical-transport assembly into an area in which the reagent-addition-tube assembly will be precisely moved in order to add reagents to wells. Alternatively, the reagent-addition-tube assembly may be moved across the RCP in a direction orthogonal to the direction in which the RCP is moved within the automated-oligonucleotide-synthesis system.

Figure 8:
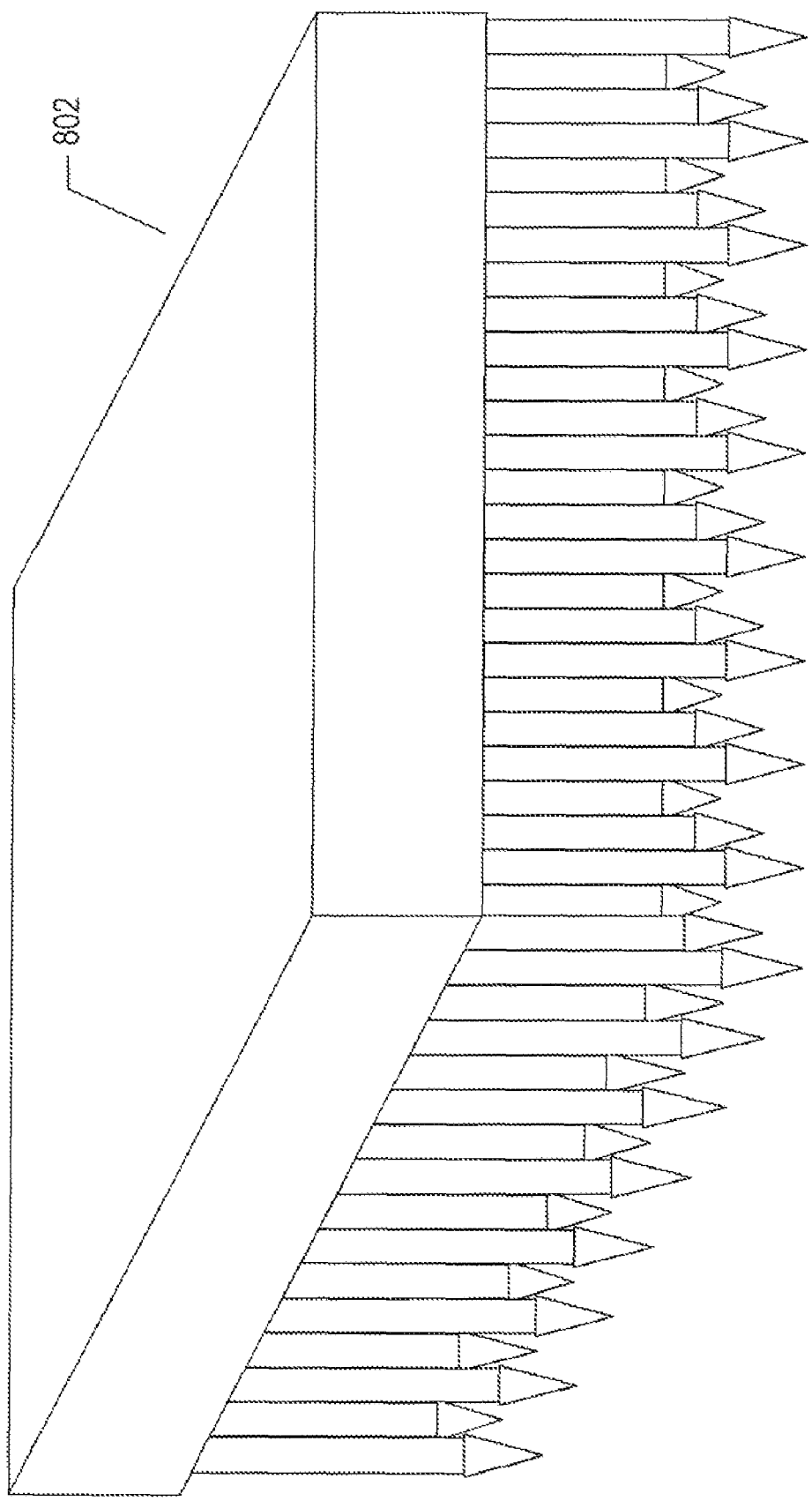
FIG. 8 illustrates an 8×10 reagent-addition-tube assembly used in certain types of automated-oligonucleotide-synthesis systems.

Reagent-addition-tube assemblies and reagent-removal assemblies can have many different implementations. As discussed above, it is generally important that a particular reagent-addition tube and valve system transports only a single type of reagent solution into reaction chambers. Thus, at least one reagent-addition tube and valve system is needed for each of the different reagent solutions and solvents added to reaction chambers during the initiation phase, cyclic monomer-addition phase, and termination phase of automated-oligonucleotide synthesis. In certain systems, there are 10 different reagent solutions used during oligonucleotide synthesis. The number of reagent solutions and solvents may vary, depending on the exact chemistry employed to synthesize oligonucleotides. Thus, at a minimum, at least ten valve-controlled reagent-addition tubes are needed for a system that employs ten different reagent solutions and solvents. However, to increase throughput and simplify mechanical operation, it is convenient to dedicate a number of valve-controlled reagent-addition tubes equal to the length of a row of wells in an RCP to each different reagent solution. In the case illustrated in FIGS. 5-7B, the RCP has rows containing eight wells, and thus eight valve-controlled reagent-addition tubes are together incorporated within a single reagent-addition-tube assembly that can mechanically scan through the rows of the RCP. The reagent-addition-tube assemblies may be discrete, column-like assemblies for each of the different reagent solutions, as shown in FIGS. 7A-B. Alternatively, the rows of valve-controlled reaction-addition tubes can be incorporated into a single 8×n reaction-addition tube assembly, where n is the number of different reagent solutions and solvents used during the oligonucleotide-synthesis process. FIG. 8 illustrates an 8×10 reagent-addition-tube assembly used in certain types of automated-oligonucleotide-synthesis systems. This 8×10 reagent-addition-tube assembly 802 can be mechanically controlled to position a selected row of eight valve-controlled reagent-addition tubes, dedicated to a particular reagent solution, above a selected row of eight wells of an RCP. In yet additional types of automated-oligonucleotide-synthesis systems, a single high-speed valve-controlled reagent-addition tube can be employed to add a particular reagent solution to all of the wells of an RCP to which the reagent solution is to be added using a two-dimensional raster-like scanning mechanism for positioning the single valve-controlled reagent-addition tube over selected wells.

The wells, or reaction chambers, RCPs are roughly hemispherical or cylindrical vessels containing a matrix of solid-substrate beads or particles within a porous, polymeric network. For example, the solid-substrate can be controlled-pour-glass beads or polystyrene beads that provide relatively large surface areas, per bead volume, for covalent attachment of nascent oligonucleotides. The controlled-pour-glass or polystyrene beads are mixed with a polymer resin or slurry to form a solid-substrate-containing porous, polymer network referred to as a "frit." The frit is generally positioned at the bottom of a well, above and within a small aperture in the bottom of the well through which reagent solutions can be drained by application of a pressure differential across the reaction chamber. In certain systems, small tubes or capillaries, with frits positioned at the bottom of the tubes or capillaries, are used as reaction chambers.

In relatively large-volume automated-oligonucleotide-synthesis systems, application of a pressure differential across relatively large-volume reaction chambers provides a moderately effective means for draining reagents from reaction chambers. However, this mechanism does not scale well to low-volume oligonucleotide-synthesis systems. Comparatively large pressure differentials need to be applied to smaller-volume reaction chambers in order to overcome adhesion of reagent solutions and solvents to the walls of the reaction chambers and the frits and to overcome the surface tension of the reagent solutions and solvents in order to force the reagent solutions and solvents out through the bottom of the reaction chambers. These large pressure differentials tend to compress the matrix and render the fits less and less porous, over time, requiring even larger pressure differentials which, in turn, even further compress the matrix material. Furthermore, in any chemical system, there is a certain percentage of the reagent solutions that cannot be removed by applying a pressure differential. The fraction of solution that cannot be removed is often proportional to the surface area of the reaction chamber and frit components, in the case of automated-oligonucleotide-synthesis systems. In low-volume reaction chambers, the ratio of surface area to volume is relatively greater than in large-volume reaction chambers, so that a relatively larger fraction of the reagent solution in low-volume reaction chambers is not amenable to pressure-differential-based removal.

Embodiments of the present invention are directed to overcome the limitations and deficiencies of pressure-differential-based solution removal during automated synthesis of biopolymers and synthetic polymers and, in particular, during automated synthesis of oligonucleotides. Embodiments of the present invention employ wicking, or capillary action, to draw reagent solutions and solvents from reaction chambers rather than employing traditional pressure-differential-based methods. A functional wicking-based reagent-removal mechanism removes much of the reagent solution from the reaction chamber as possible without compressing the fit matrix and without experiencing degradation of the wicking components due to the corrosive nature of certain of the reagents and solvents used during oligonucleotide synthesis.

FIGS. 9A-B illustrate an individual reaction chamber, or well, used in a low-volume automated-oligonucleotide-synthesis system that represents one embodiment of the present invention. FIG. 9A shows the well within a small surrounding volume of a reaction-chamber plate 902. The well 904 has a roughly cylindrical volume, with tapered sides, and is open at the upper surface 906 of the RCP. There is a small aperture 908 at the bottom of the well, with an aspect ratio, or radius-to-height ratio, greater than 1.0. The aperture opens into a shallow concave impression in the underside of the RCP 908. FIG. 9B shows the well, or reaction chamber, shown in FIG. 9A in an alternative, cross-section view. In FIG. 9B, the cross-section of the volume occupied by the fit 910 is shown cross-hatched. As described above, reagent solutions are dropped into the well at the beginning of each substep of oligonucleotide synthesis, and, after remaining in the well for a particular period of time, referred to as the "wait time" or "wait period," the reagent solution is drained through the aperture at the bottom of the well.

Figure 10A:
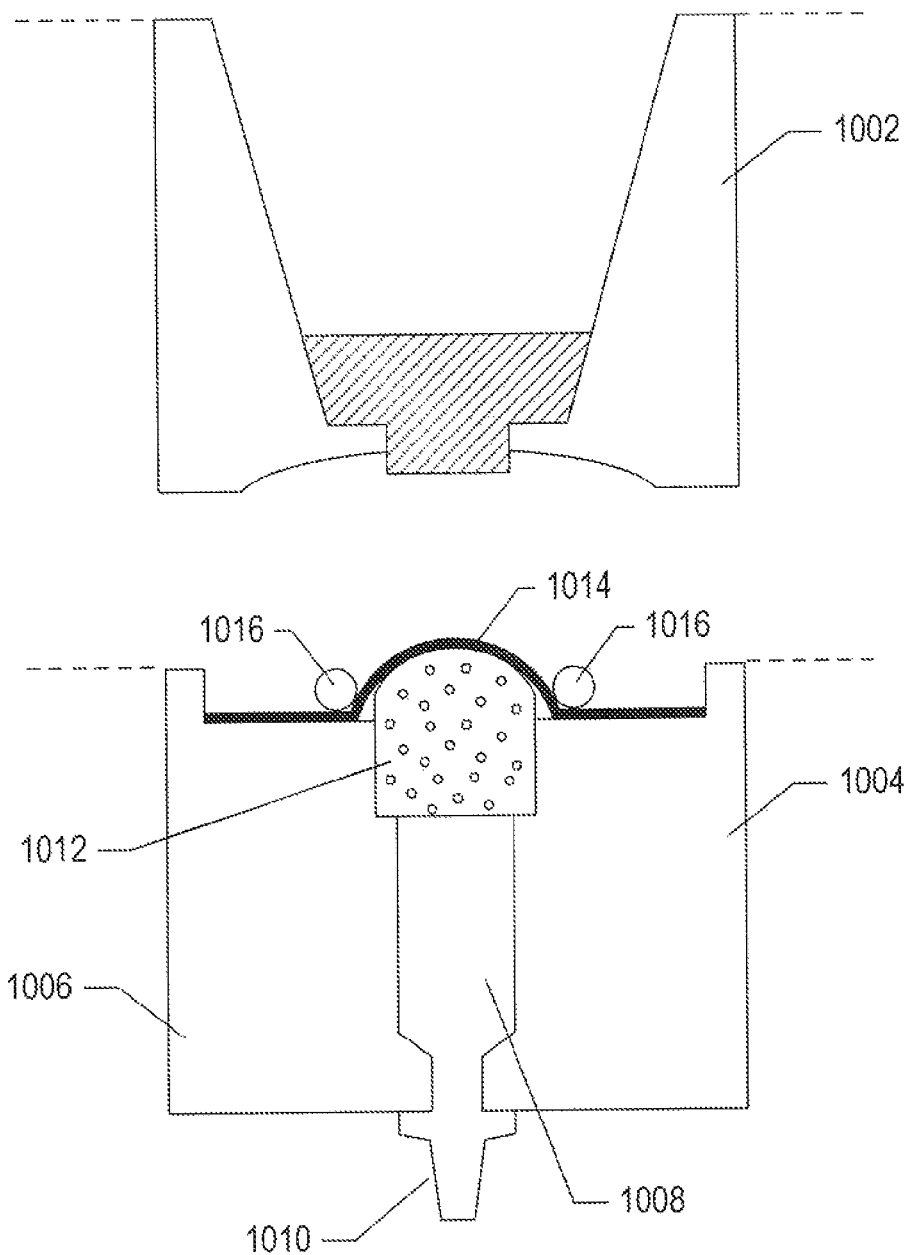
FIGS. 10A-B illustrate a reagent-solution-removal sub-component, or assembly, within an automated-oligonucleotide-synthesis system that represents an embodiment of the present invention.
Figure 10B:
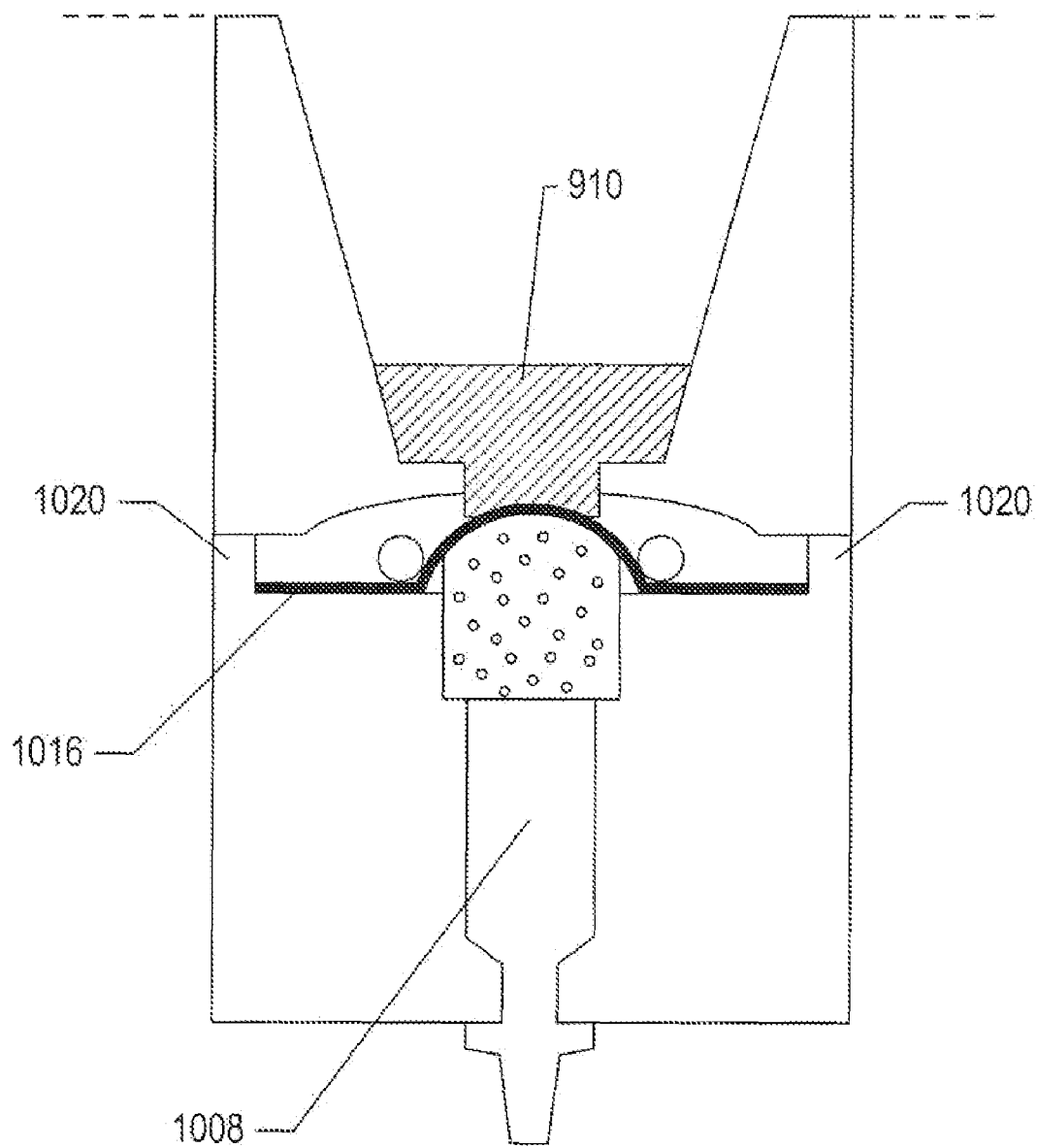

FIGS. 10A-B illustrate a reagent-solution-removal subcomponent, or assembly, within an automated-oligonucleotide-synthesis system that represents an embodiment of the present invention. An RCP containing multiple reaction chambers, or wells, including the reaction chamber 1002 shown in FIG. 10A, is positioned within a reagent-solution-removal component or position. In this component or position, the bottom portions of the RCP below all or a portion of the reaction chambers in the RCP is exposed to a reagent-solution-draining assembly 1004. A well is shown positioned over the reagent-solution-draining assembly, without the reagent-solution-draining assembly contacting the RCP and well, as shown in FIG. 10A. The reagent-solution-draining assembly 1004 includes a mechanical body 1006 that can be moved at least in the vertical direction. A waste-removing chamber 1008 with an exposed tip 1010 extends downward through the body of the reagent-solution-draining assembly. A vacuum line or drain line can be removably affixed to the exposed tip. A porous, relatively rigid, hemispherically shaped cap 1012 is fitted above the reagent-draining chamber 1008 and a relatively compliant wicking medium 1014 is mounted above, and partially in contact with, the porous cap 1012. In certain embodiments of the present invention, the wicking medium is clamped to the upper surface of the reagent-solution-draining assembly by a curved or circular clamp, shown in cross-section 1016 in FIG. 10A. The wicking medium 1014 can be composed of any of many different types of absorbent materials, including relatively compliant materials, including non-woven fabrics, paper, sponge-like materials, and soft plastics or more rigid materials, including woven fabrics, rigid plastics, and sintered materials. In one embodiment of the present invention, a polypropylene felt is employed. Other types of porous wicking media, including paper, glass-fiber filter-membrane materials, porous plastic materials, sheets of synthetic or natural polymeric materials, and many other types of absorbent materials can be employed. Examples include polyethylene, polyfluoroethylene, nylon, polyesters, and other synthetic polymers, chosen depending on their absorbance for the particular solutions that need to be drained. Natural-fiber examples include cotton, wool, and other natural materials. Polypropylene felt and other types of synthetic polymeric materials are particularly desirable due to their relative chemical inertness. In the embodiment shown in FIGS. 10A-B, the wicking material is a planar sheet, with a thickness varying from less than one to several millimeters, and may be thicker or thinner for particular applications.

Once the RCP and well are properly positioned with respect to the reagent-solution-draining assembly, the reagent-solution-draining assembly is moved vertically in order to contact the bottom of the reaction chamber, as shown in FIG. 10B. Note that, as shown in FIG. 10B, the wicking medium 1014 is pushed slightly into the frit material 910 that protrudes slightly below the lower surface of the RCP. Alternatively, the wicking material may be slightly pushed into the aperture to contact the frit material. The reagent-solution-draining assembly has one or more lips 1020 that contact the base of the RCP to ensure that the contact between the wicking medium and porous cap below the wicking medium with the frit within the reaction chamber produce insufficient vertical force to disturb or displace the frit material. These lips also serve to constrain solvents used to wash the wicking material after solution-draining operations. The reagent-solution-draining assembly may be mounted to a spring or elastic material to ensure that the force of contact between the wicking material and frit is constrained to remain below a threshold minimal force that could damage the frit material or reaction chamber. More often, the entire assembly is precisely controlled by pneumatic or other means to prevent potentially harmful contact forces between the wicking material and the frits. The reagent-solution-draining assembly is held in the position shown in FIG. 10B for sufficient time to drain the reagent solution from the reaction chamber, including from the porous frit material. Often, the time needed to drain a sufficient amount of reagent solution from the reaction chamber ranges from 3 to 15 seconds. The reagent solution is initially absorbed through the wicking material 1014, but then, over time, is pulled through the porous cap into the draining chamber 1008 by a combination of capillary action and, in certain embodiments, a pressure differential applied from below to the reagent-draining chamber. The pressure differential is not, however, applied to the reaction chamber or frits, and is applied only to remove solvent and reagent solution from the wicking material. In order to maintain the wicking material in a chemically clean state, the wicking material may be washed by an acetonitrile-depositing valve-controlled tube, such as those described with reference to FIG. 5, at points in time when there is no RCP and reaction chamber positioned above the reagent-solution-draining assembly. In many embodiments of the present invention, a single reagent-solution-draining assembly can be employed to drain all of the reagent solutions used during oligonucleotide synthesis.

However, in alternative embodiments, multiple reagent-draining assembles can be employed to drain particular reagent solutions in the case that it is found that even slight amounts of drained reagent solutions remaining in the wicking material and inadvertently exchanged with the frit material during reagent-draining operations may deleteriously affect subsequent synthetic steps. In certain embodiments, a compliant layer of wicking material is omitted, with the capillary action provided entirely by the porous cap.

FIGS. 11A-B illustrate one example of a current automated-oligonucleotide-synthesis system. As shown in FIG. 11A, a typical automated-oligonucleotide-synthesis system includes a combined reagent-dispensing and reagent-solution-draining station 1102 and a track or conveyor for moving RCPs output from the combined reagent-dispensing and reagent-solution-draining station 1104 to the input 1106 of the combined reagent-dispensing and reagent-solution-draining station 1102. In general, the track or conveyor 1108 has a fixed maximum capacity for RCPs, or carriers, such as carrier 1110. In these currently available automated-oligonucleotide-synthesis systems, a system is loaded with up to a fixed maximum number of carriers, and then all of these carriers are automatically processed to synthesize oligonucleotides according to an electronically stored synthesis plan. These systems do not allow for carriers containing only completed oligonucleotides to be removed and new carriers substituted for removed carriers during synthesis, but instead require that all carriers remain in the system until the carrier containing the longest oligonucleotide to be synthesized has been completely processed. This, of course, represents a serious inefficiency when only one or a few carriers contain wells in which the longest nucleotides are synthesized, since the remaining carriers are idle after all the oligonucleotides being synthesized within them have been completed.

These systems also have poor throughput characteristics. FIG. 11B illustrates, in graph form, processing of a next carrier within the combined reagent-dispensing and reagent-solution-draining station 1102. In FIG. 11B, the horizontal axis 1122 represents time. The carrier-processing cycle begins when a next carrier is available for input to the combined reagent-dispensing and reagent-solution-draining station, represented in FIG. 11B by the origin 1120. Once the next carrier is input into the combined reagent-dispensing and reagent-solution-draining station, at time point 1124, reagent dispensing is carried out, as represented by the block of time 1126 in FIG. 11B. Reagent dispensing involves positioning an appropriate row of valve-controlled reagent-addition tubes over successive rows of the carrier and dispensing the next-needed reagent solution into appropriate wells. For certain steps of the monomer-addition cycle, the same reagent solution may be dispensed into each well of a carrier. In other steps, such as phosphoramidite-coupling steps, a particular phosphoramidite-coupling solution is added only to those wells that include nascent oligonucleotides to which the nucleotide corresponding to the particular phosphoramidite-coupling solution needs to be added. Once reagents have been added to all of the reaction chambers, or wells, of the carrier during the reagent-dispensing phase, represented in FIG. 11B by time block 1126, a suitable wait period, represented by time block 1130 in FIG. 11B, ensues. At the expiration of the wait period, represented by time point 1132 in FIG. 11B, either the carrier is moved into position for reagent-solution draining, or a reagent-solution-draining assembly is moved into position to begin draining reagent solution from the wells of the carrier during time block 1134 in FIG. 11B. Once the reagent solution is drained from all of the wells in the carrier, the carrier is output from the combined reagent-dispensing and reagent-solution-draining station 1102 onto the track or conveyor 1108 for eventual input back into the combined reagent-dispensing and reagent-solution-draining station, in the case that another round of monomer addition is needed for any well of any carrier following the output carrier in the sequence of carriers arrange along the conveyor loop.

Examination of FIG. 11B reveals the source of throughput efficiency in the automated-oligonucleotide-synthesis system illustrated in FIG. 11A. During the entire time period shown in FIG. 11B, only a single carrier is being processed, and during this time period, the reagent-dispensing component of the automated-oligonucleotide-synthesis system is carrying out reagent dispensing only for a relatively small fraction of the cycle time. Thus, during operation of the automated-oligonucleotide-synthesis system illustrated in FIG. 11A, most carriers sit idly on the conveyor, and the components of the combined reagent-dispensing and reagent-solution-draining station are idle for the majority of time that a particular carrier is being processed within the combined reagent-dispensing and reagent-solution-draining station.

FIGS. 12A-B illustrate an example of automated-oligonucleotide-synthesis systems that represent embodiments of the present invention. FIGS. 12A and 12B use the same illustration conventions as used in FIGS. 11A-B. As shown in FIG. 12A, the automated-oligonucleotide-synthesis system that represents an example of the present invention includes a separate dispensing station 1202 and separate reagent-solution-draining station 1204. Thus, the operations combined within the combined reagent-dispensing and reagent-solution-draining station 1102 in FIG. 11A have been separated. Furthermore, a buffer 1206 has been introduced between the dispensing station and reagent-solution-draining station. Once the dispensing state has finished dispensing reagents to all the wells in a carrier needing additional reagents, the carrier is output from the dispensing station 1202 into the buffer 1206. The carrier remains in the buffer during the wait period and is then output from the buffer into the reagent-solution-draining station 1204 for reagent-solution removal. Entry of carriers into the buffer is controlled by a buffer-in switch 1208 and exit of carriers from the buffer is controlled by a buffer-out switch 1210. In addition, the automated-oligonucleotide-synthesis system that represents an embodiment of the present invention includes a carrier-input spur 1212 controlled by an input switch 1214 as well as a carrier output spur 1216 controlled by an output switch 1218. Like the previously discussed automated-oligonucleotide-synthesis system, the example automated-oligonucleotide-synthesis system that represents an embodiment of the present invention also includes a main carrier loop consisting of a track or conveyor 1220.

The architecture of the automated-oligonucleotide-synthesis system shown in FIG. 12A provides numerous advantages over the automated-oligonucleotide-synthesis system discussed above with FIG. 11A. First, each carrier is processed independently, within the system, from all other carriers. Carriers can be queued for input on the input spur 1212 and recovered, following completion of all the oligonucleotides within the carrier wells, from the output spur 1216, without dependencies on processing of other carriers. Carriers are continuously input into the main loop as space becomes available, so that the automated-oligonucleotide-synthesis system remains as filled with carriers as possible. Also, the carriers reside in the buffer 1206 during the wait period, rather than within the combined reagent-dispensing and reagent-solution-draining station of the automated-oligonucleotide-synthesis system shown in FIG. 11A. This removes a significant portion of the idle time of system components and significantly increases overall throughput of the system, as shown in FIG. 12B. Because reagent dispensing has been separated from reagent-solution draining, and both have been separated from the wait period, the reagent-dispensing station continuously dispenses reagents in successive blocks of time 1230-1233. Once a carrier is available for reagent-solution draining, the reagent-solution-draining component can be similarly relatively continuously engaged, as represented by time blocks 1240-1243 in FIG. 12B.

Figure 13:
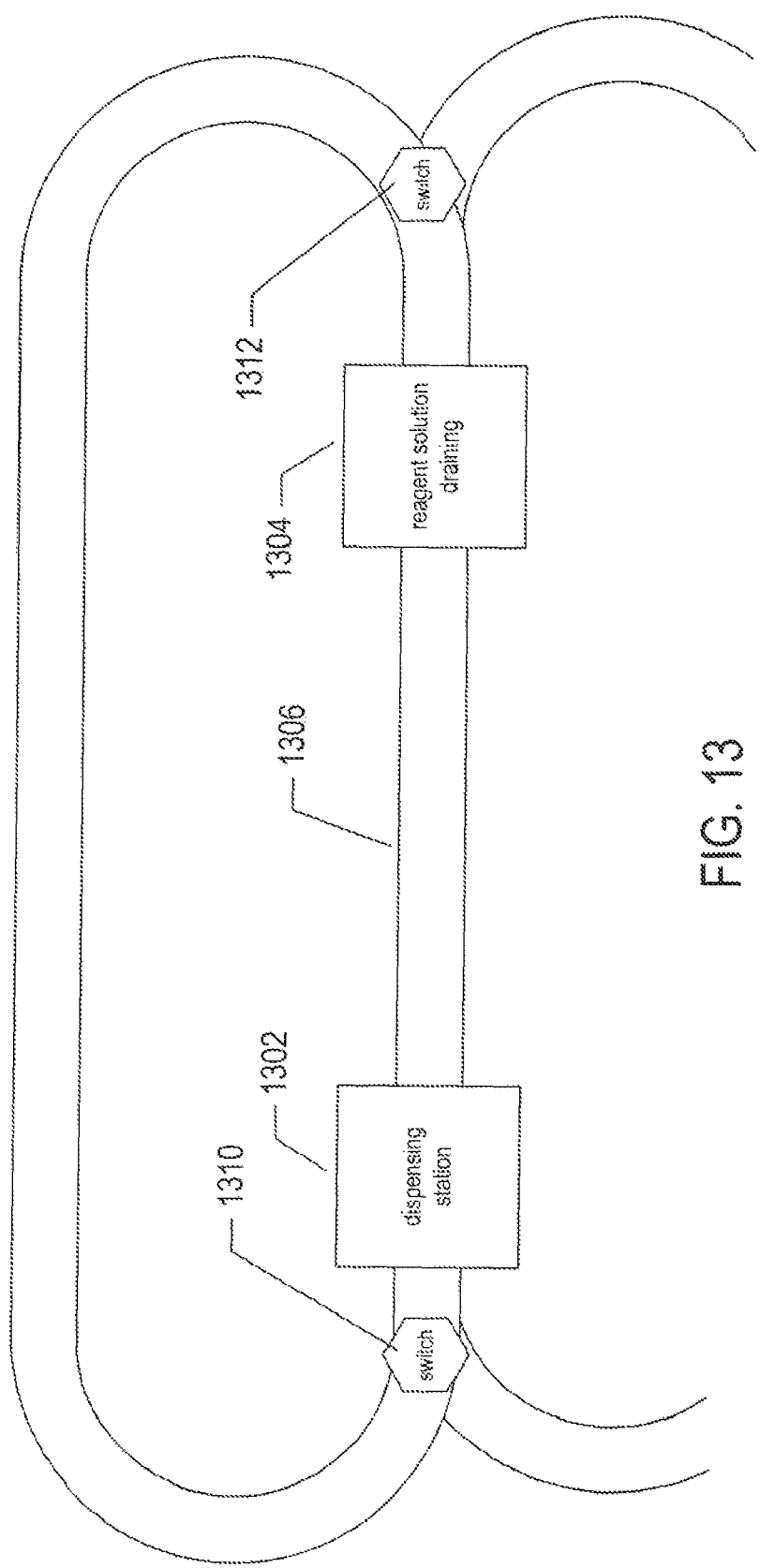
FIG. 13 shows a minimal automated-oligonucleotide-synthesis system that represents an example of the present invention in that it incorporates basic features of the automated-oligonucleotide-synthesis system shown in FIG. 12A.

There are many possible alternative implementations of the automated-oligonucleotide-synthesis system discussed above with reference to FIGS. 12A-B. For example, FIG. 13 shows a minimal automated-oligonucleotide-synthesis system that represents an example of the present invention in that it incorporates basic features of the automated-oligonucleotide-synthesis system shown in FIG. 12A. In the minimal automated-oligonucleotide-synthesis system that represents an embodiment of the present invention, there is a separate dispensing station 1302 and reagent-solution-draining station 1304. The buffer is simply a sufficiently long stretch of the main loop to contain a maximum number of carriers that can be concurrently waiting completion of a next reaction prior to reagent-solution draining. In this minimal system, only an input switch 1310 and an output switch 1312 are needed.

Figure 14:
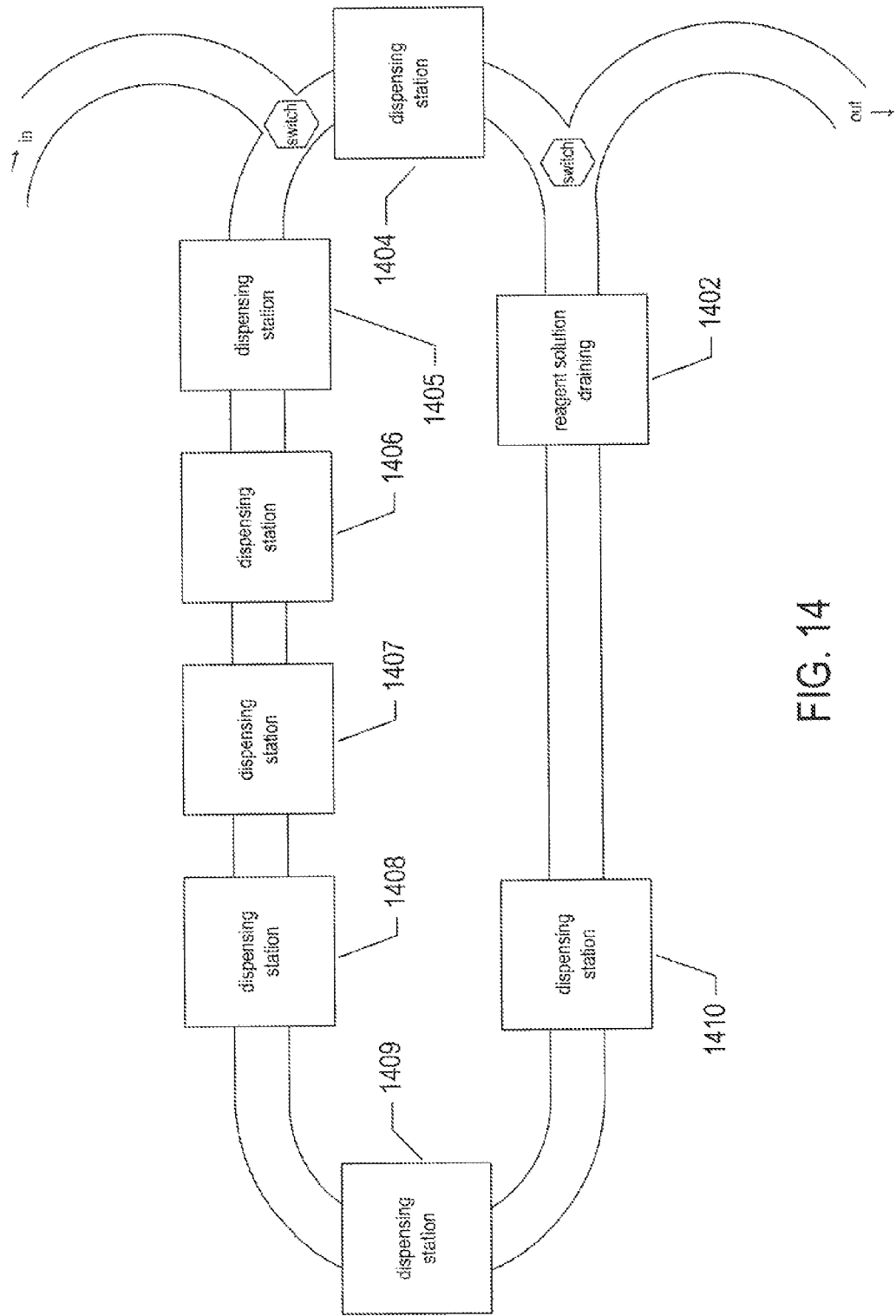
FIG. 14 illustrates yet another example embodiment of the automated-oligonucleotide-synthesis system that represents one embodiment of the present invention.

FIG. 14 illustrates yet another example embodiment of the automated-oligonucleotide-synthesis system that represents one embodiment of the present invention. The automated-oligonucleotide-synthesis system shown in FIG. 14 includes a separate draining station 1402 and a relatively large number of dispensing stations 1404-1410. In this automated-oligonucleotide-synthesis system, each dispensing station is devoted to dispensing of a single reagent solution or solvent, or perhaps a small number of related reagent solutions or solvents. In this architecture, the dispensing station is greatly simplified and becomes a modular component that can be easily added to the automated-oligonucleotide-synthesis system when synthesis protocols are changed to need a greater number of reagent solution. For example, rather than the complex two-dimensional-array of valve-controlled reagent-addition tubes, illustrated in FIG. 8, each separate dispensing station may employ a simple column or row of valve-controlled reagent-addition tubes, such as that shown in FIG. 5.

FIGS. 15A-F illustrate, using control-flow diagrams, controller functionality embodied within an automated-oligonucleotide-synthesis system illustrated in FIG. 12A that represents an embodiment of the present invention. The control system is generally implemented as software, firmware, logic circuits, or a combination of two or more of software, firmware, and logic circuits. Software and firmware instructions are generally executed by one or more microcontrollers or processors within a control system or computer system that monitors and controls operation of the automated-oligonucleotide-synthesis system. Automated-oligonucleotide-synthesis systems that represent embodiments of the present invention employ various types of carrier-recognition technologies, such as optical scanners that scan barcodes attached to carriers, in order to identify the location of carriers and carrier identities at various points in the system. In the automated-oligonucleotide-synthesis system shown in FIG. 12A, optical scanning is carried out by the input switch 1214, the buffer-out switch 1210, and the output switch 1218. In addition, optical scanners may be embodied within the dispensing station and at other points within the automated-oligonucleotide-synthesis system. Each carrier is described by a data structure that is generated, when the carrier is input to the system, from data previously input by a user and, in certain cases, from data collected during interaction with a human user. The dispensing station, reagent-solution-draining station, the various switches, buffer, main loop, and spurs all employ well-known electrical and mechanical implementation techniques used in various types of automated systems. The buffer, for example, may actually be implemented as a circular or elliptical stack or conveyor, but can also be implemented as a jukebox-like storage component or in many other different ways. It is assumed, in the following discussion, that the main loop, spurs, and buffer continuously operate until the carrier is positioned for input into a switch or station, much like the conveyors leading to a grocery-checkout station continuously operate until a next item to be checked out reaches the checkout station.

Figure 15A:
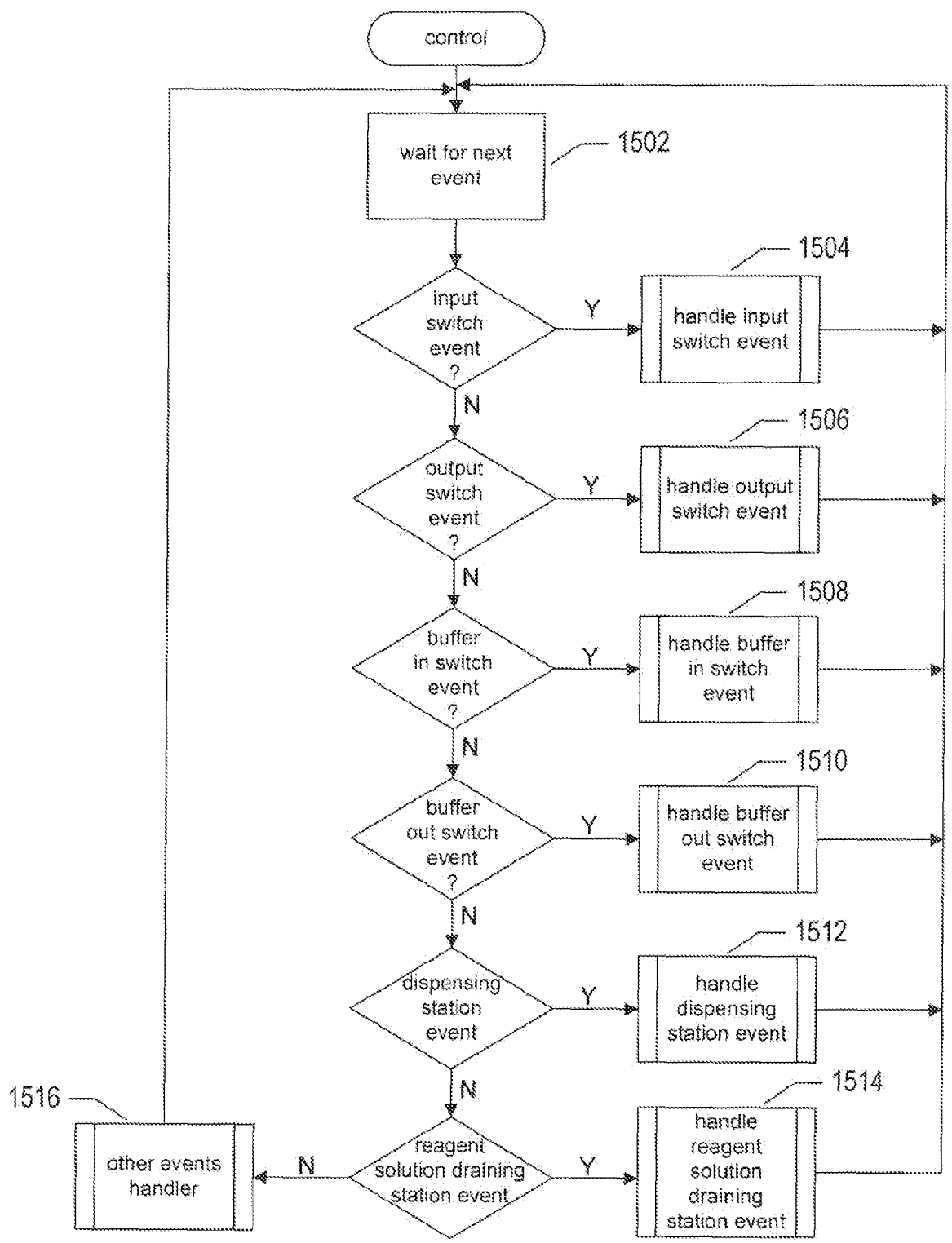
FIGS. 15A-F illustrate, using control-flow diagrams, controller functionality embodied within an automated-oligonucleotide-synthesis system illustrated in FIG. 12A that represents an embodiment of the present invention. The control system is

FIG. 15A provides a control-flow diagram for the highest-level description of the control program. The control program is essentially an event loop in which the control program waits, in step 1502, for a next even to occur and then calls an appropriate event handler to handle the event. In general, the event handlers execute asynchronously with respect to the main event-handling loop, and execution of the handlers may be stacked, as in the case of interrupt handling in a computer operating system. As shown in FIG. 15A, there is a separate event handler for the input switch 1504 (1214 in FIG. 12A), the output switch 1506 (1218 in FIG. 12A), the buffer-in switch 1508 (1208 in FIG. 12A), the buffer-out switch 1510 (1210 in FIG. 12A), the dispensing station or stations 1512 (1202 in FIG. 12A) and the reagent-solution-draining station 1514 (1204 in FIG. 12A). An additional default event handler 1516 handles any other types of events that arise in the system, including various types of error events and operator-control events.

Figure 15B:
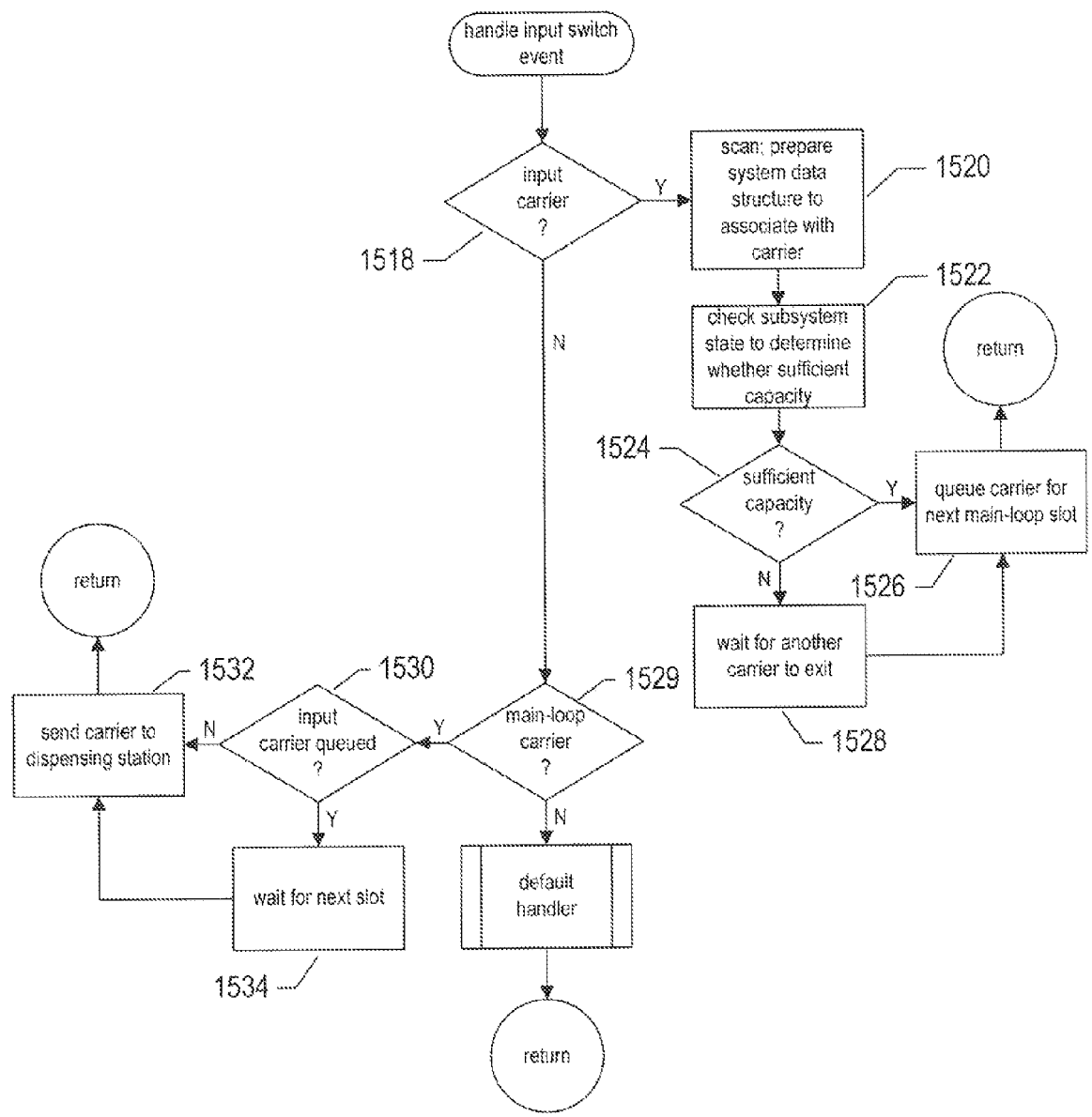

FIG. 15B provides a control-flow diagram for the input switch-event handler called in step 1504 of FIG. 15A. When the event that triggered invocation of the event handler is detection of a newly input carrier on the spur 1212 leading to the input switch 1214, as determined in step 1518, the input switch scans the barcode on the carrier to identify the carrier and prepares a data structure that is stored within the system to track the carrier during oligonucleotide synthesis in step 1520. Then, in step 1522, the input switch checks the system state or status to determine whether or not there is sufficient capacity for adding another carrier to the automated-oligonucleotide-synthesis system. When there is sufficient capacity, as determined in step 1524, then the carrier is queued for input to the main loop in step 1526. Otherwise, in step 1528, the input switch waits until output of a next carrier from the system to the output spur 1216 is reported by the output switch 1218. When the event that triggered invocation of the event handler corresponds to queuing of a next carrier from the main loop, as determined in step 1529, then, in step 1530, the event handler determines whether or not a new carrier has been queued for input from the input spur, in step 1530. When there is no new carrier waiting for input, then the carrier from the main loop is sent on by the input switch to the dispensing station in step 1532. Otherwise, the input switch waits to forward the carrier to the dispensing station until a next new input carrier has been added to the main loop, in step 1534.

Figure 15C:
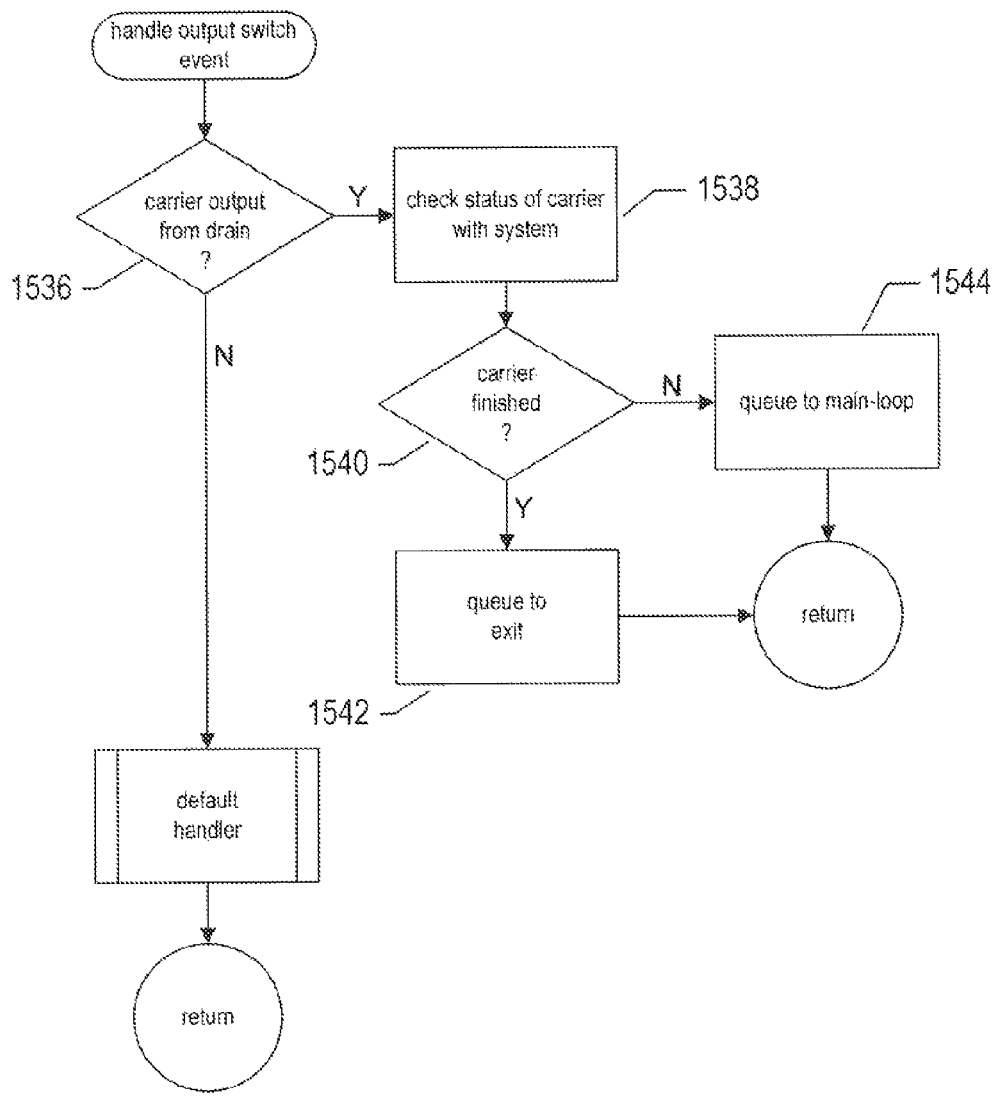

FIG. 15C provides a control-flow diagram for the output-switch event handler. When the event that triggered invocation of the event handler corresponds to detection of a carrier output from the reagent-solution-draining station, as determined in step 1536, then the output switch checks the system's status and the status of the carrier in step 1538. When all oligonucleotides syntheses for the wells of the carrier is finished, as determined in step 1540, then the carrier is queued to the exit spur in step 1542 (1216 in FIG. 12A). Otherwise, the carrier is queued back to the main loop in step 1544.

Figure 15D:
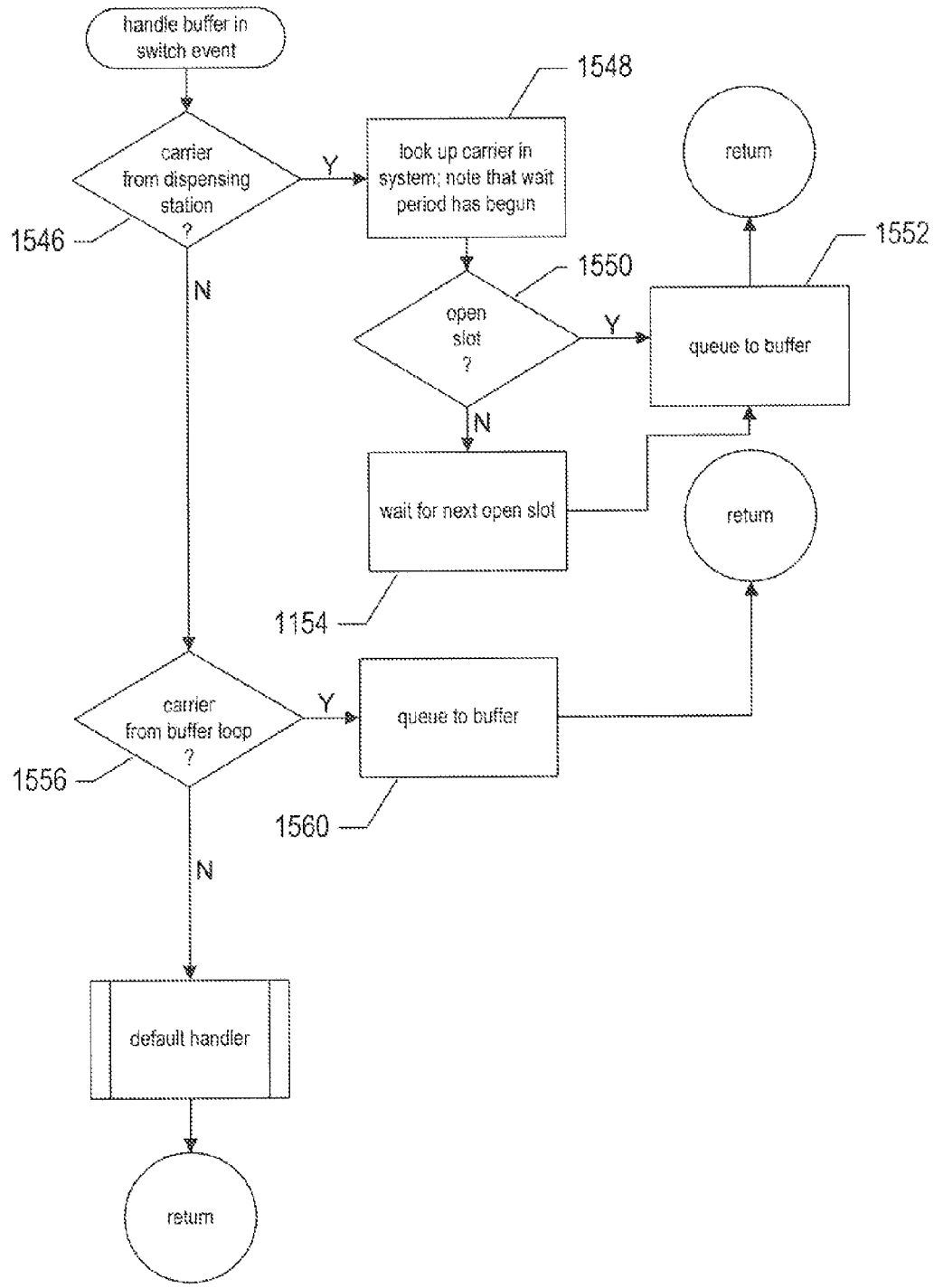

FIG. 15D provides a control-flow diagram for the buffer-in switch event. When the event that triggered invocation of the event handler corresponds to a carrier output from the dispensing station, as determined in step 1546, then, in step 1548, the switch scans the carrier to identify the carrier and makes an entry to the data structure that represents the carrier to indicate that the wait period for the carrier has begun. If there is an open slot in the buffer, as determined in step 1550, the carrier is queued to the buffer in step 1552. Otherwise, the event handler waits for a next open slot in the buffer in step 1554 before queuing the carrier to the buffer in step 1552. Otherwise, when this buffer-in switch detects input of a carrier from the buffer loop, as determined in step 1556, the buffer-in switch queues that buffer back to the buffer loop in step 1560.

Figure 15E:
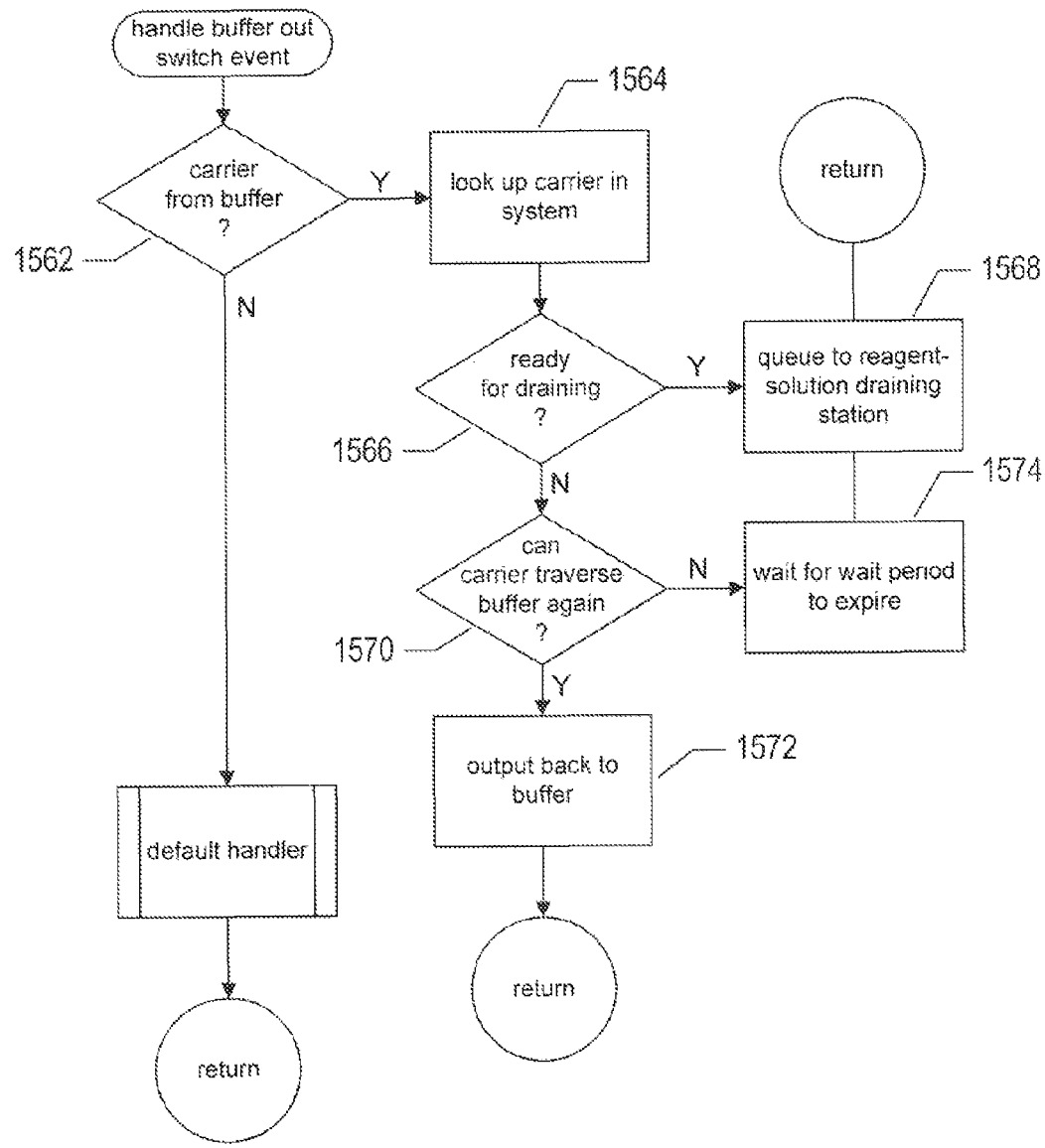

FIG. 15E provides a control-flow diagram for the handling of a buffer-out switch event. When the event that triggered invocation of the event handler corresponds to a carrier being received by the switch from the buffer loop, as determined in step 1562, then, in step 1564, the event handler looks up the carrier in the system to determine the status of the carrier. When the carrier is ready for draining, as determined in step 1566, the carrier is queued to the reagent-solution-draining station in step 1568. Otherwise, when the carrier can wait long enough to traverse the buffer again, as determined in step 1570, the carrier is output back to the buffer in step 1572. Otherwise, the event handler waits for a sufficient period of time for the wait period for the carrier to expire, in step 1574 before queuing the carrier to the reagent-solution-draining station in step 1568.

Figure 15F:
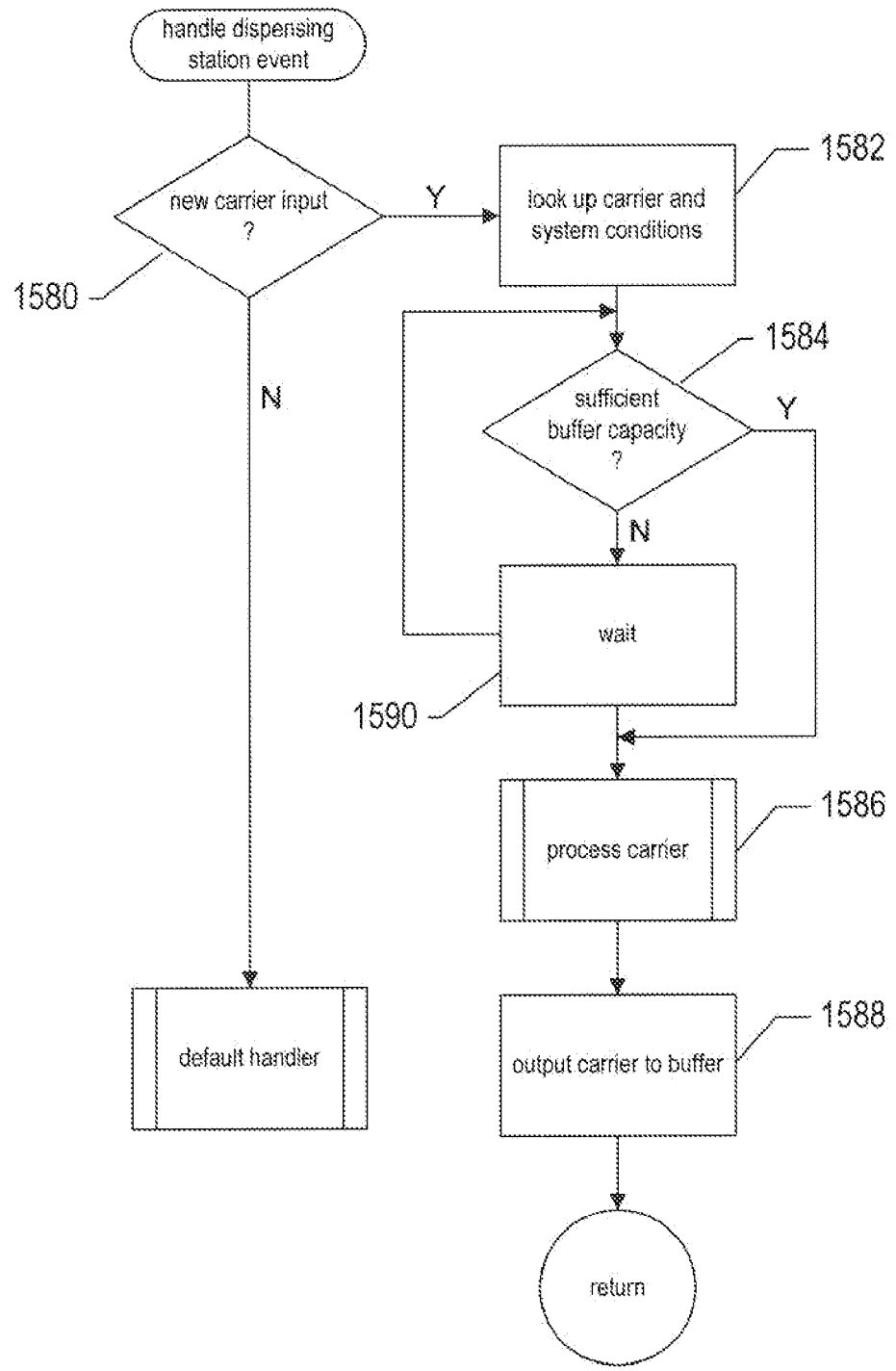

FIG. 15F is a control-flow diagram for the dispensing-station event handler. When the event that triggered invocation of the event handler corresponds to input of a carrier from the main loop, as determined in step 1580, the event handler checks the carrier data structure and the current state of the system in step 1582. When there is sufficient buffer capacity to enable the carrier to be processed, as determined in step 1584, the dispensing reagent-dispensing station processes the carrier in step 1586 by dispensing appropriate reagents to appropriate wells and outputs the carrier to the buffer in step 1588. Otherwise, the event handler waits, in step 1590 and then assesses whether there is sufficient buffer capacity to process the carrier in step 1584. Note that, in the example illustrated in FIG. 12A and in FIGS. 15A-F, it is assumed that the reagent-dispensing station represents the rate-limiting step, or throttle point, within the automated-oligonucleotide-synthesis system. When this is not the case, then system-capacity-testing project may need to be included in the event handler for a switch or station that does represent a throttle point or rate-limiting step. No control-flow diagram is provided for the reagent-solution-draining station event handler, since the reagent-solution-draining station does not represent a throttle point, or rate-limiting step, in the described system, and the reagent-solution-draining station therefore processes each input carrier and outputs the processed carrier when the draining step is concluded.

Figure 16:
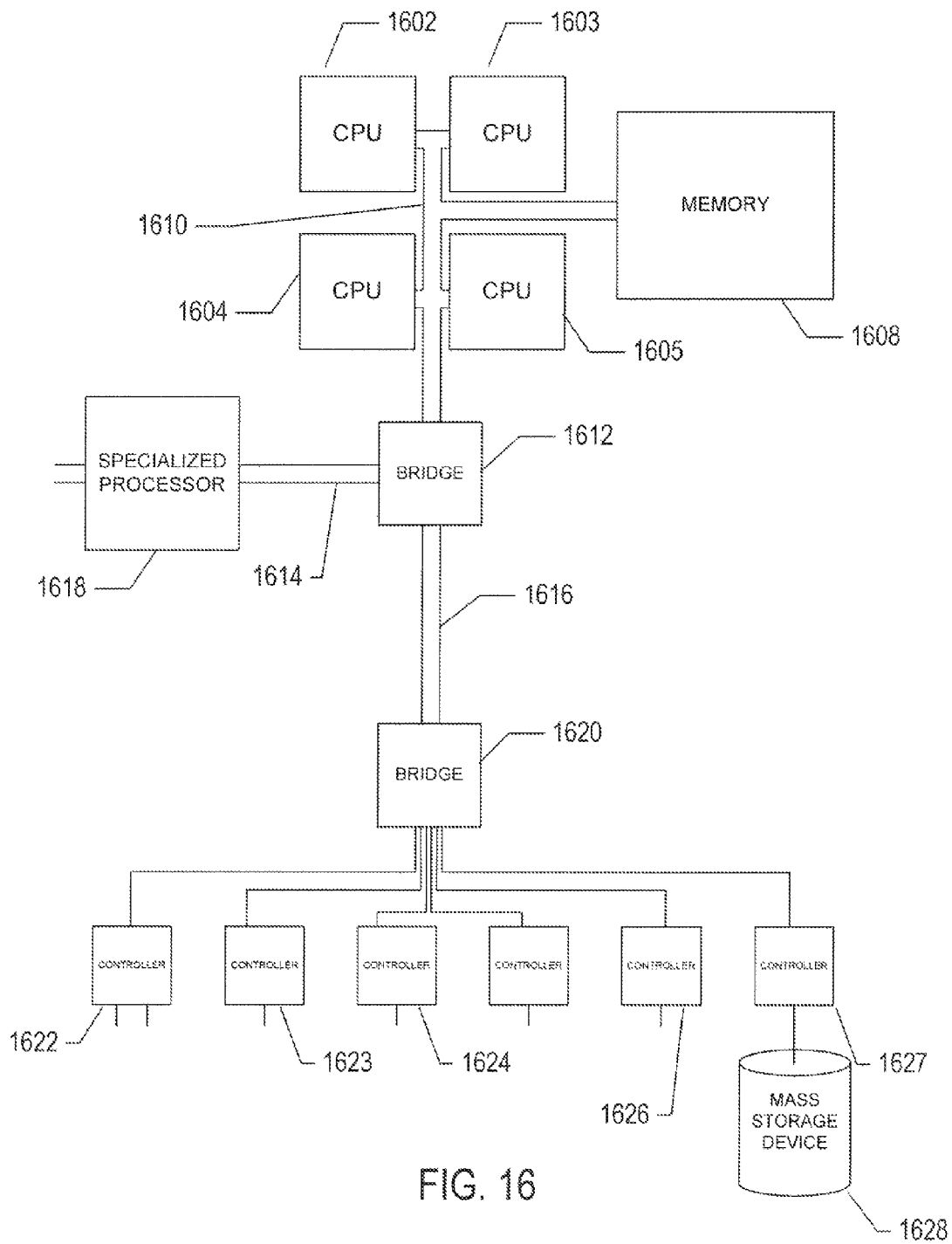
FIG. 16 illustrates a general-purpose computer system that, when executing an automated-polymer-synthesis-system control program, comprises a system embodiment of the present invention.

FIG. 16 illustrates a general-purpose computer system that, when executing an automated-polymer-synthesis-system control program, comprises a system embodiment of the present invention. The computer system contains one or multiple central processing units ("CPUs") 1602-1605, one or more electronic memories 1608 interconnected with the CPUs by a CPU/memory-subsystem bus 1610 or multiple busses, a first bridge 1612 that interconnects the CPU/memory-subsystem bus 1610 with additional busses 1614 and 1616, or other types of high-speed interconnection media, including multiple, high-speed serial interconnects. These busses or serial interconnections, in turn, connect the CPUs and memory with specialized processors, such as a graphics processor 1618, and with one or more additional bridges 1620, which are interconnected with high-speed serial links or with multiple controllers 1622-1627, such as controller 1627, that provide access to various different types of mass-storage devices 1628, electronic displays, input devices, and other such components, subcomponents, and computational resources. Embodiments of the present invention may also be implemented on distributed computer systems, can also be implemented partially in hardware logic circuitry, and can be implemented on many other types of microprocessor-controlled devices, from mobile phones to computer notebooks and laptops.

Although the present invention has been described in terms of particular embodiments, it is not intended that the invention be limited to these embodiments. Modifications will be apparent to those skilled in the art. For example, as discussed above, there are myriad different electromechanical implementations for various different components, subcomponents, and assemblies within an automated-oligonucleotide-synthesis system that represents an embodiment of the present invention. Moreover, the control logic for an automated-oligonucleotide-synthesis system can be implemented in many different ways, by varying any of many different implementation parameters, including programming language, modular organization, data structures, control structures, and other such parameters.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. An automated-polymer-synthesis system comprising:
   a reagent-solution-dispensing sub-system that dispenses reagent solutions and solvents into reaction chambers of reaction-chamber carriers;
   a reagent-solution-draining sub-system that drains reagent solutions and solvents from reaction chambers of reaction-chamber carriers;
   a buffer sub-system that transports reaction-chamber carriers output from the reagent-solution-dispensing sub-system to the reagent-solution-draining sub-system over a period of time during which a reaction occurs; and
   a transport sub-system that returns reaction-chamber carriers output from the reagent-solution-draining sub-system to the reagent-solution-dispensing sub-system.

2. The automated-polymer-synthesis system of claim 1 wherein the transport sub-system further includes:
   an output switch that receives carriers output from the reagent-solution-draining sub-system and forwards each received carrier to either an output spur, when no further processing steps need be applied to the carrier, or to a main loop; and an input switch that receives carriers input from either the main loop or from an input spur and forwards the received carriers to the reagent-solution-dispensing sub-system.

3. The automated-polymer-synthesis system of claim 2 wherein optical scanning of carriers is carried out, by the switches and other components of the automated-polymer-synthesis system, to track carriers as they move between the reagent-solution-dispensing sub-system and the reagent-solution-draining sub-system.

4. The automated-polymer-synthesis system of claim 3 wherein each carrier is associated with a data structure that describes the contents of the carrier, the carrier's identity, and other characteristics and parameters associated with the carrier.

* * * * *